United States Patent
Holling et al.

(10) Patent No.: US 8,936,437 B2
(45) Date of Patent: Jan. 20, 2015

(54) ROTOR LOCKING DEVICE AND METHOD FOR LOCKING A ROTOR OF A WIND TURBINE

(75) Inventors: Jochen Holling, Rheine (DE); Michael Mehren, Rheine (DE)

(73) Assignee: Availon GmbH, Rheine (DE)

( * ) Notice: Subject to any disclaimer, the term of this patent is extended or adjusted under 35 U.S.C. 154(b) by 721 days.

(21) Appl. No.: 13/214,112

(22) Filed: Aug. 19, 2011

(65) Prior Publication Data
US 2012/0045340 A1   Feb. 23, 2012

(30) Foreign Application Priority Data
Aug. 20, 2010   (DE) .......................... 10 2010 039 628

(51) Int. Cl.
| B64C 11/00 | (2006.01) |
| F03D 7/02 | (2006.01) |
| F03D 11/00 | (2006.01) |

(52) U.S. Cl.
CPC ............ *F03D 7/0248* (2013.01); *F03D 7/0268* (2013.01); *F03D 11/00* (2013.01); *F05B 2260/301* (2013.01); *F05B 2260/902* (2013.01); *F05B 2270/606* (2013.01); *Y02E 10/722* (2013.01); *Y02E 10/721* (2013.01); *Y02E 10/723* (2013.01)
USPC ...................................... 416/152; 416/220 R

(58) Field of Classification Search
CPC ... F03D 7/0248; F03D 7/0244; F03D 7/0268; F05B 2260/301; F05B 2260/902
USPC ...................... 416/220 R, 152, 151
See application file for complete search history.

(56) References Cited

U.S. PATENT DOCUMENTS

| 7,397,145 B2 * | 7/2008 | Struve et al. ................... 290/55 |
| 2007/0025840 A1 * | 2/2007 | Weaver et al. ............. 415/122.1 |

FOREIGN PATENT DOCUMENTS

| DE | 100 31 473 C1 | 2/2002 |
| DE | 10 2004 013 624 A1 | 10/2005 |
| DE | 10 2007 014 861 A1 | 10/2008 |
| DE | 10 2007 058 746 A1 | 12/2008 |
| EP | 1 167 755 A2 | 1/2002 |
| EP | 1 291 521 A1 | 3/2003 |
| WO | WO 2005-090780 A1 | 9/2005 |

OTHER PUBLICATIONS

German Search Report for Application No. 10 2010 039 628.1, dated Dec. 8, 2011, 5 pages, (no English Translation attached).
Extended European Search Report for Application No. EP 11 173 918.1, dated Sep. 29, 2011, 6 pages.

* cited by examiner

*Primary Examiner* — Dwayne J White
(74) *Attorney, Agent, or Firm* — Kilpatrick Townsend & Stockton LLP

(57) ABSTRACT

The invention relates to a mobile rotor locking device for locking a rotor of a wind turbine, the rotor locking device being designed to lock a rotor in such a way that it is prevented from rotating about a horizontal axis, and that a longitudinal axis of a rotor blade is fixed in a vertical plane. The invention also relates to a kit and a locking member for a mobile rotor locking device and to a method for locking a rotor of a wind turbine. According to the invention, the rotor locking device is characterized in that the rotor locking device is designed to fix a main shaft, on which a rotor is disposed torsionally stiffly, so that it is prevented from rotating about its longitudinal axis.

9 Claims, 47 Drawing Sheets

CROSS SECTION A-A

CROSS SECTION B-B

CROSS SECTION H-H

CROSS SECTION B-B

CROSS SECTION H-H

CROSS SECTION A-A

CROSS SECTION H-H

Figure 7C:
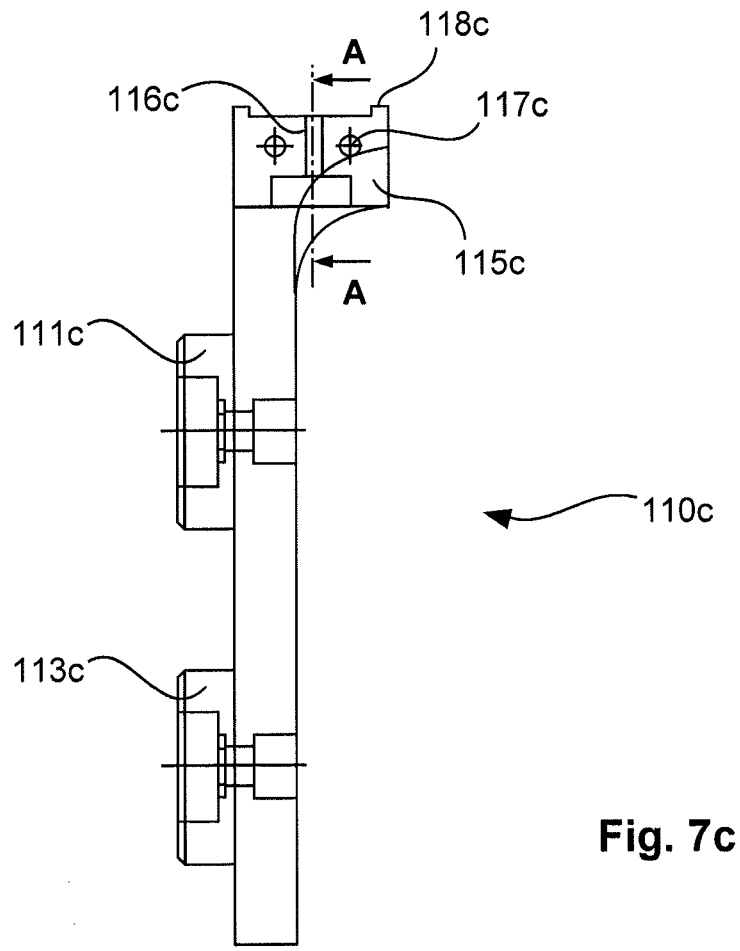
Figure 7D:
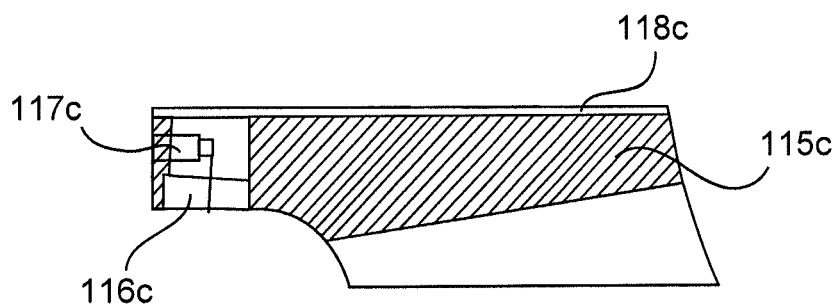
Figure 7E:
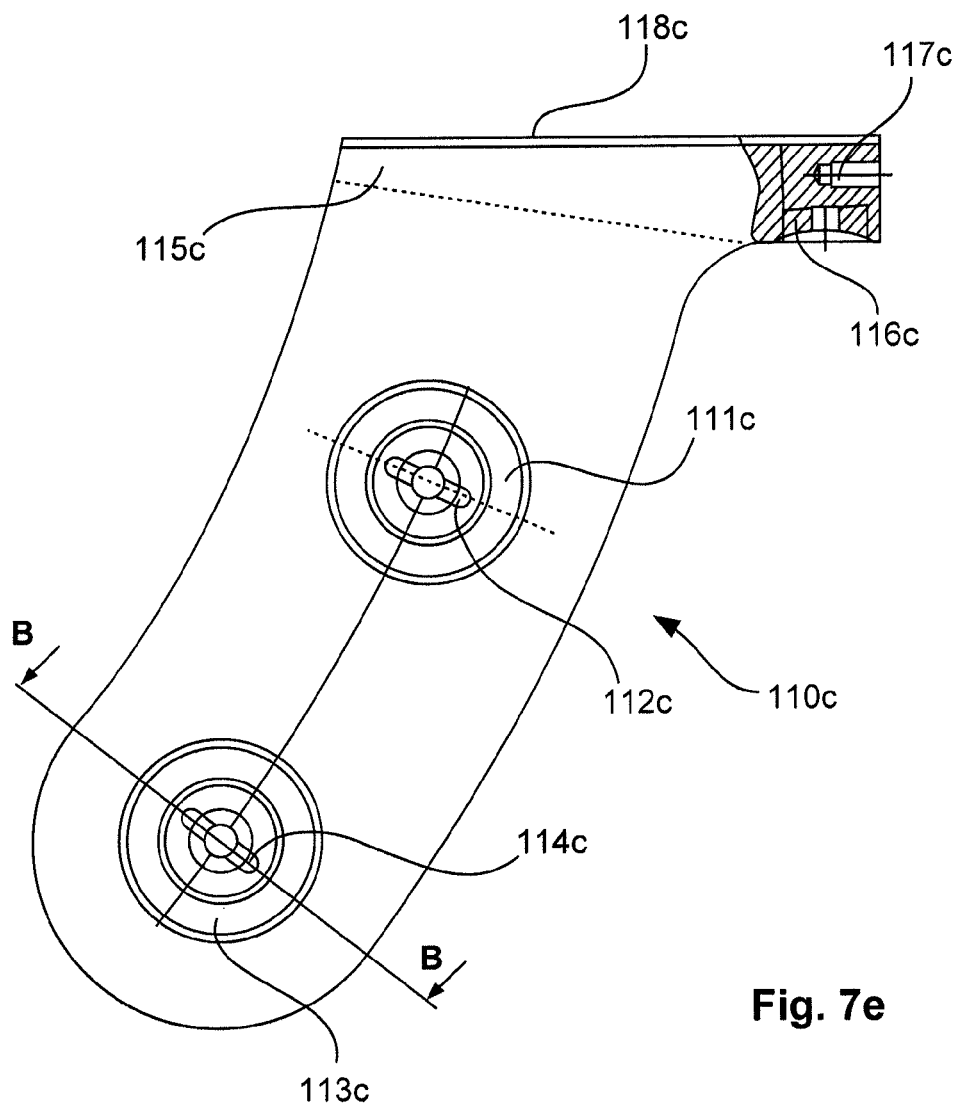
Figure 7F:
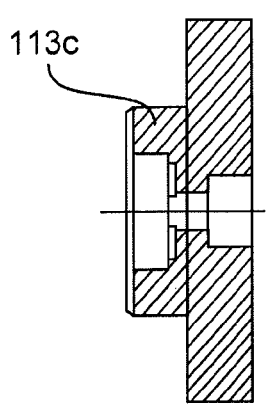
Figure 7G:
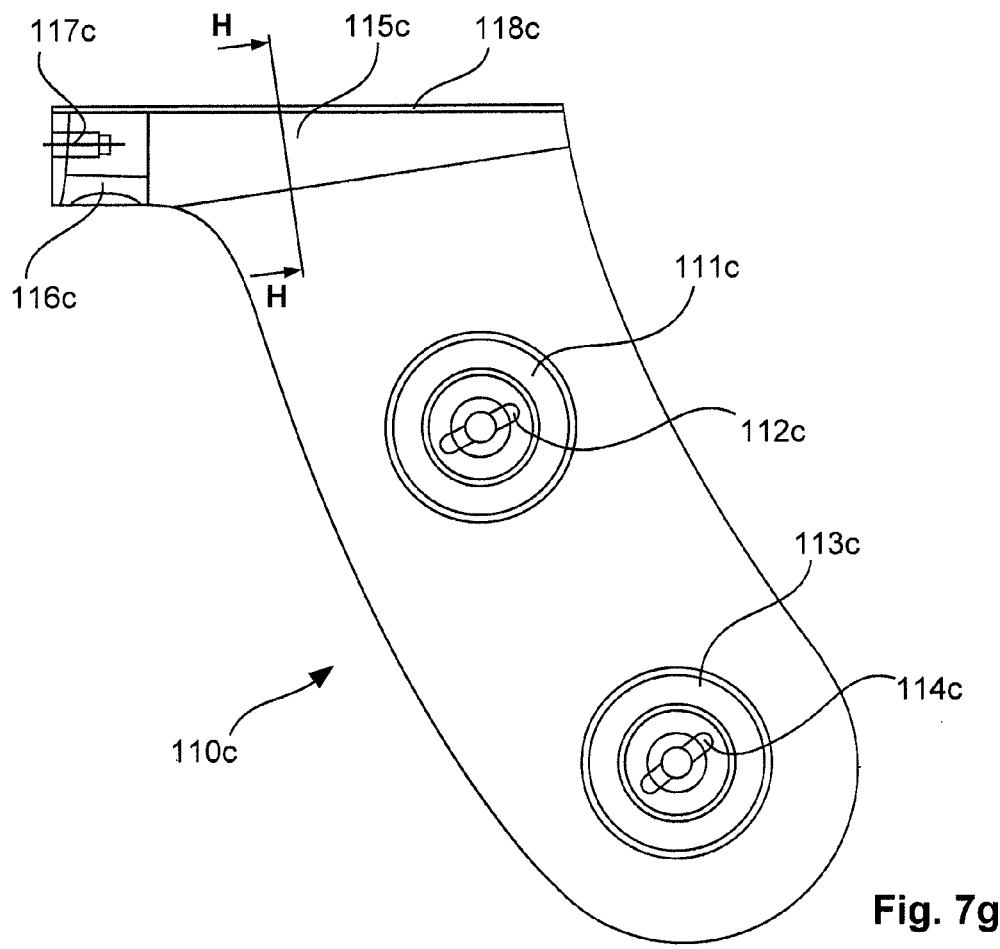
Figure 7H:
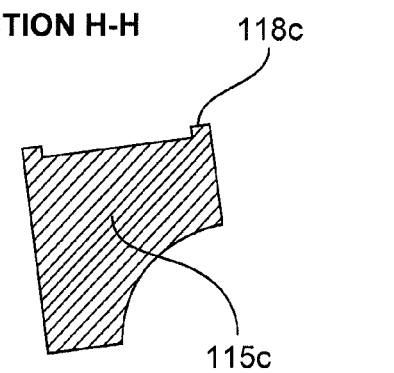
Figure 7I:
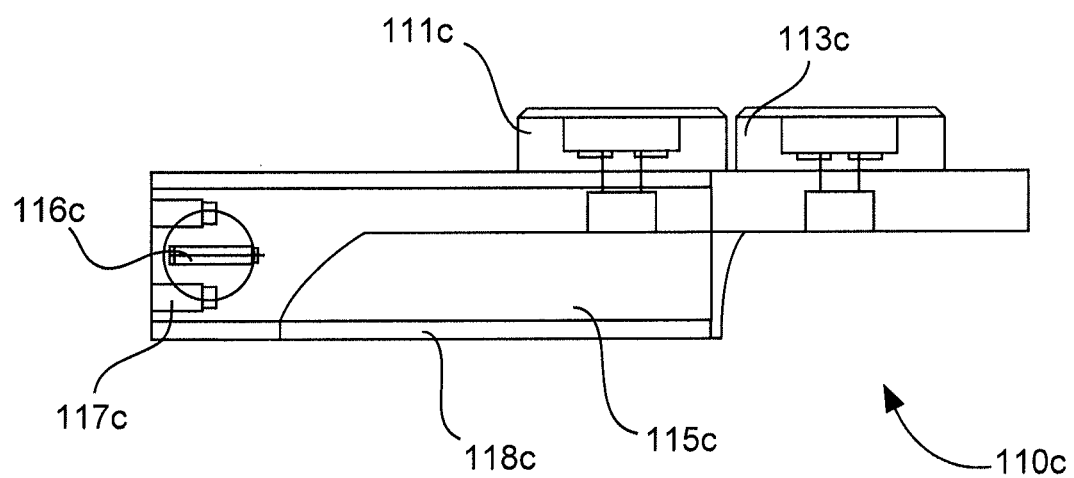
Figure 7J:
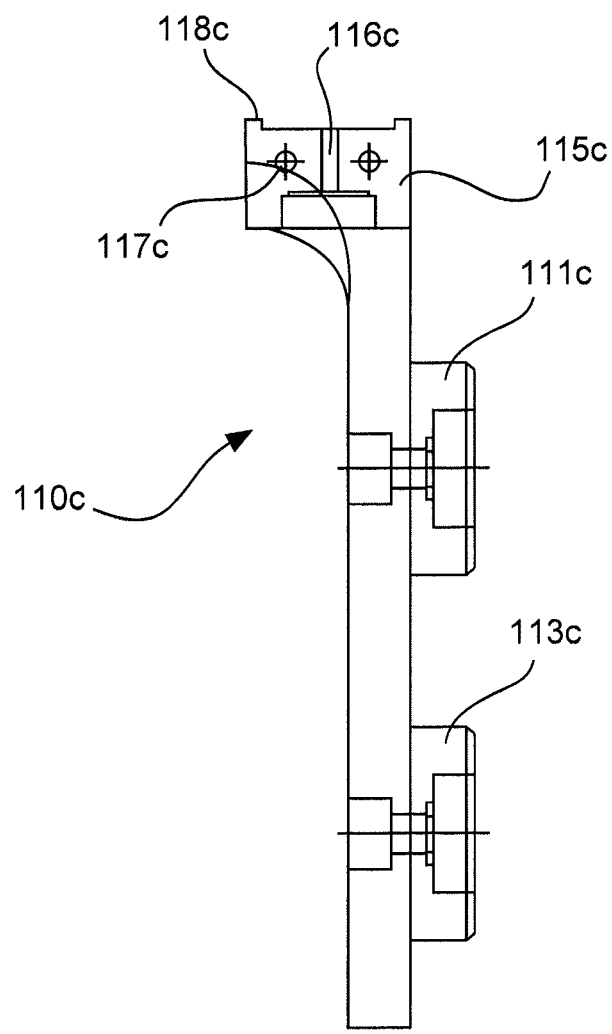
Figure 8A:
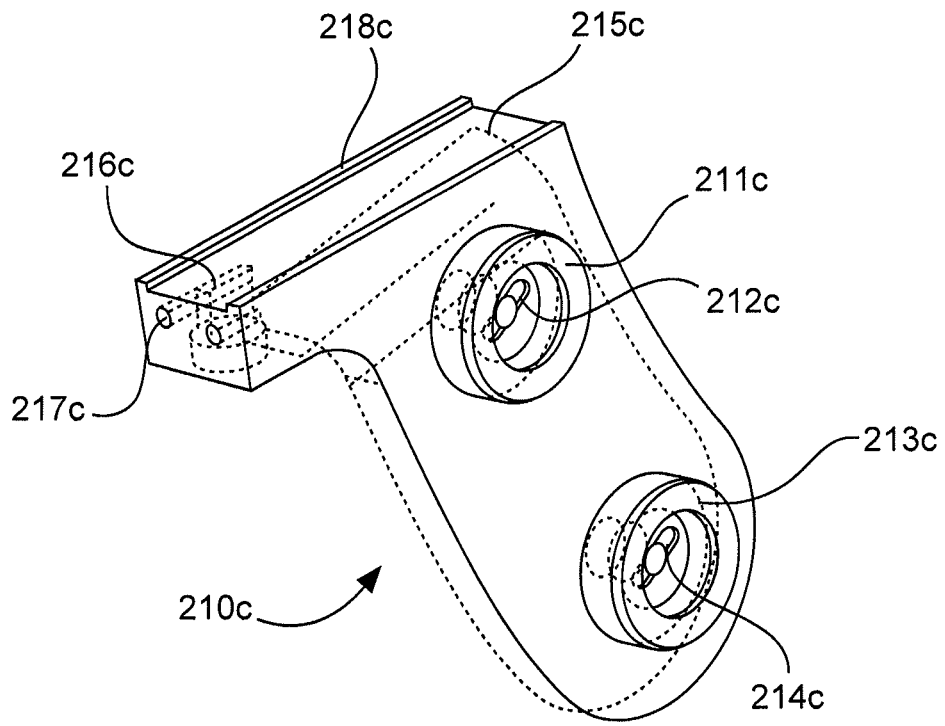
Figure 8B:
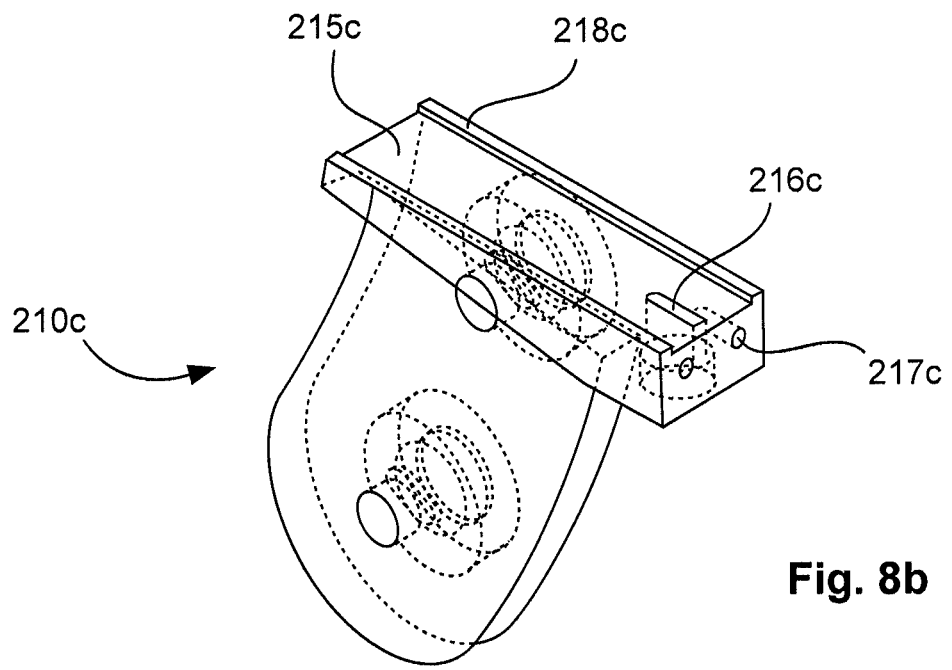
Figure 8C:
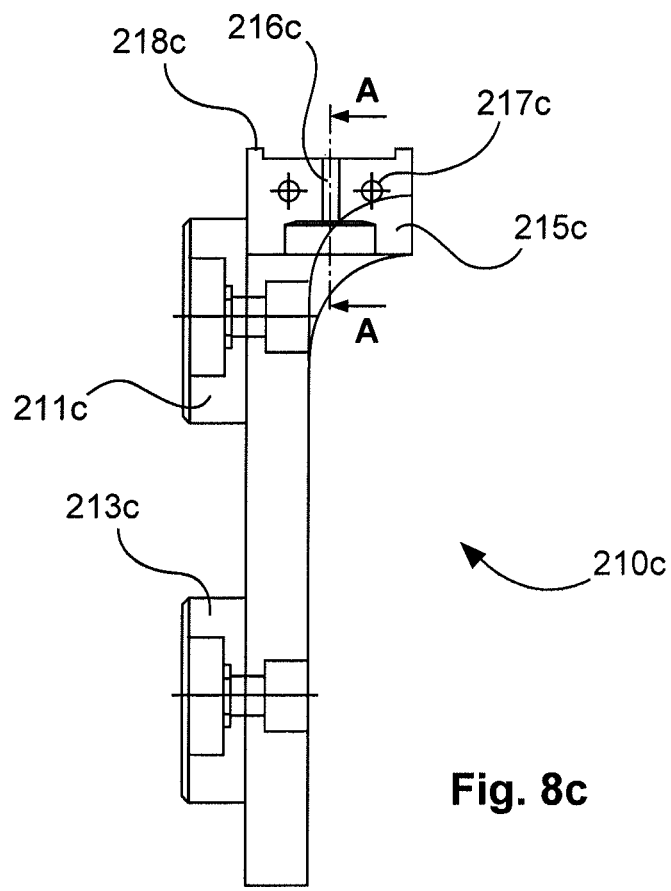
Figure 8D:
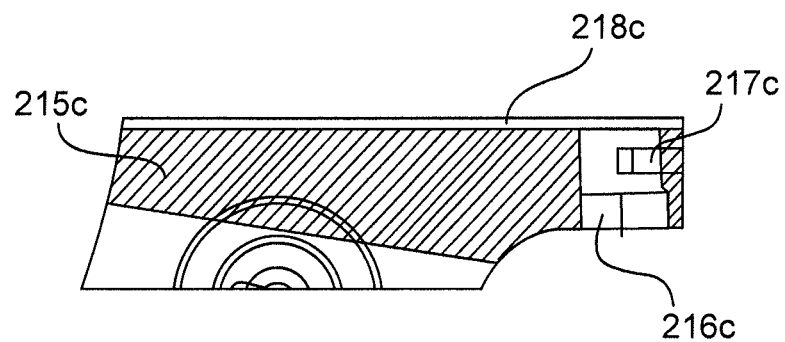
Figure 8E:
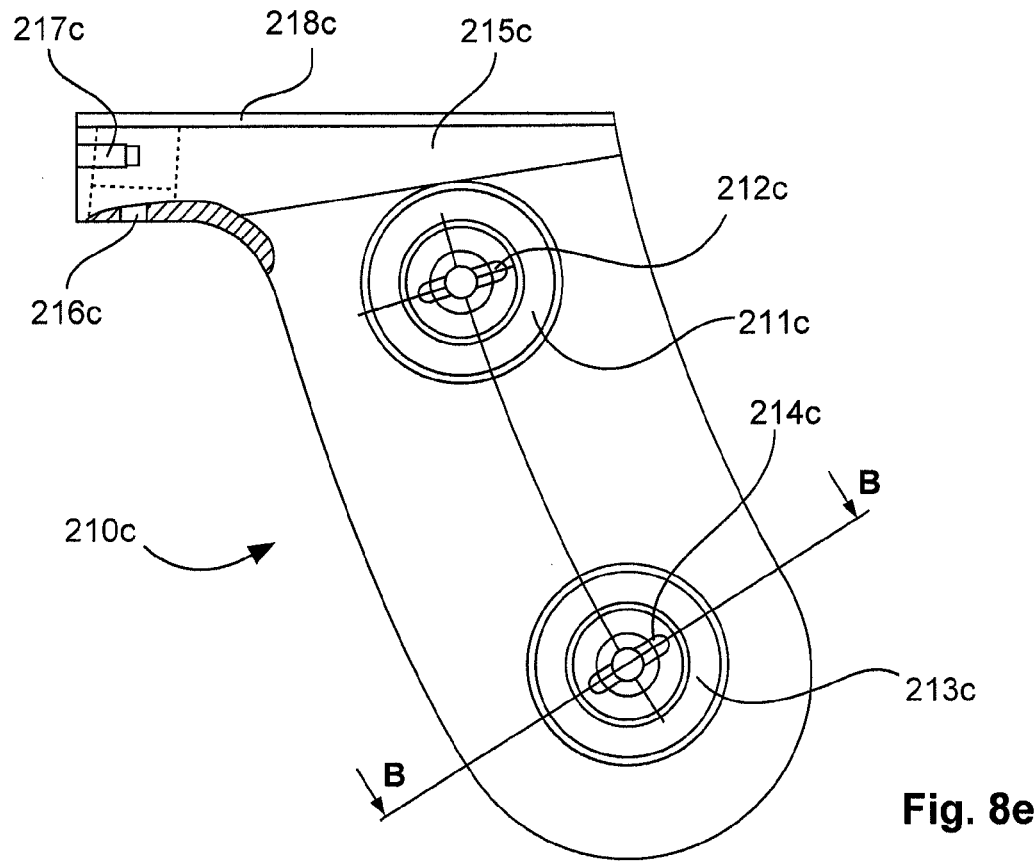
Figure 8F:
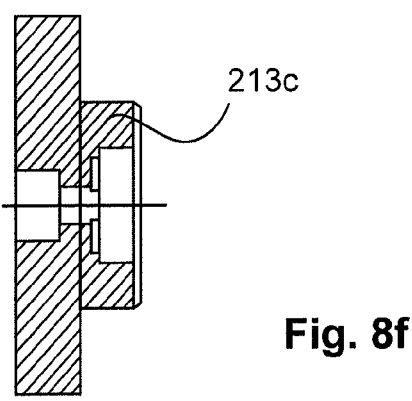
Figure 8G:
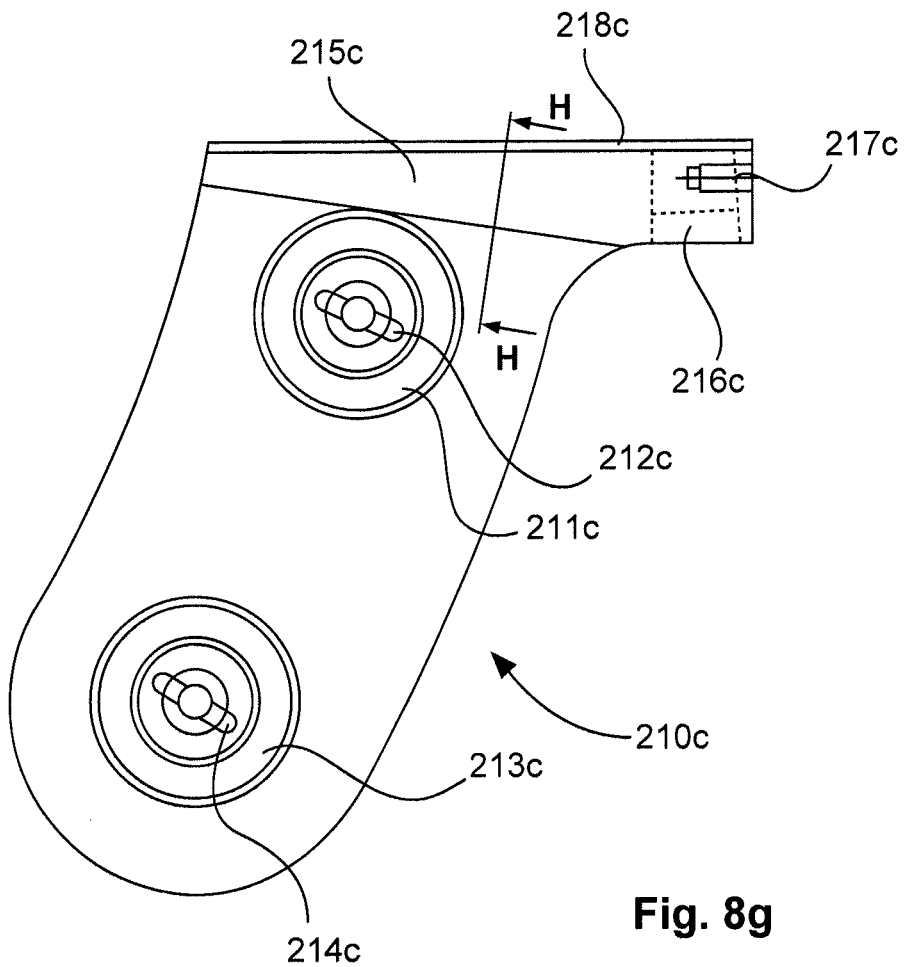
Figure 8H:
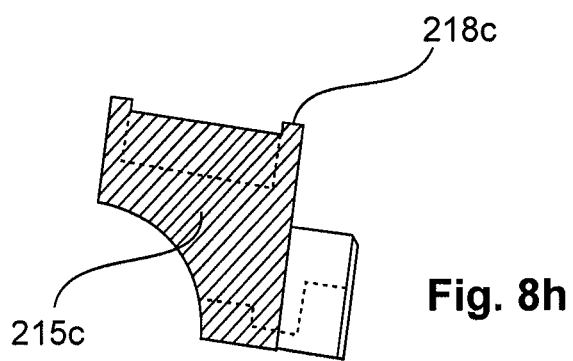
Figure 8I:
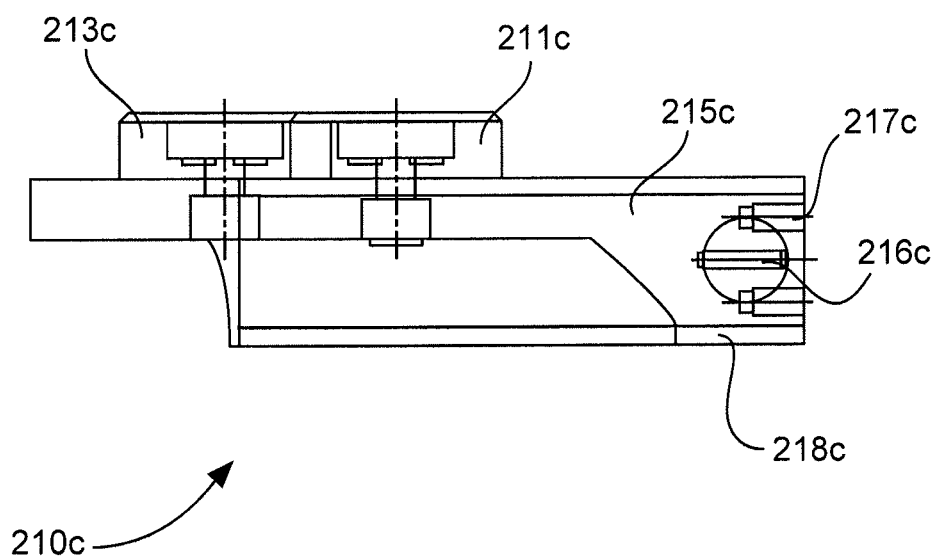
Figure 8J:
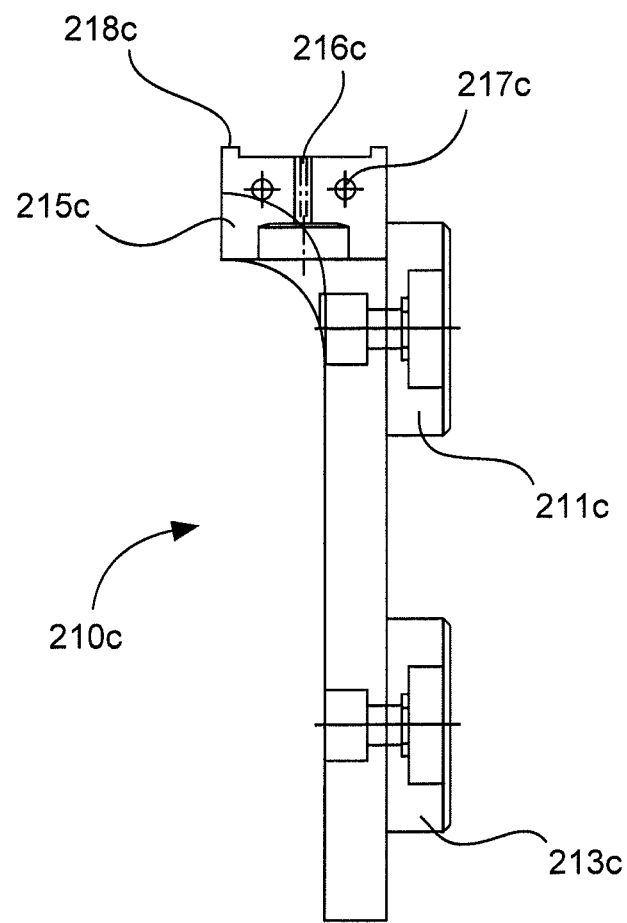
Figure 12B:
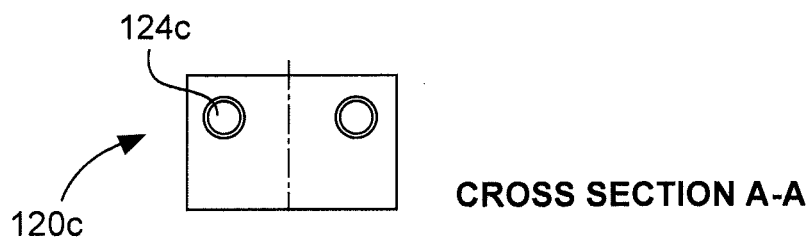
Figures 12A, 12C:
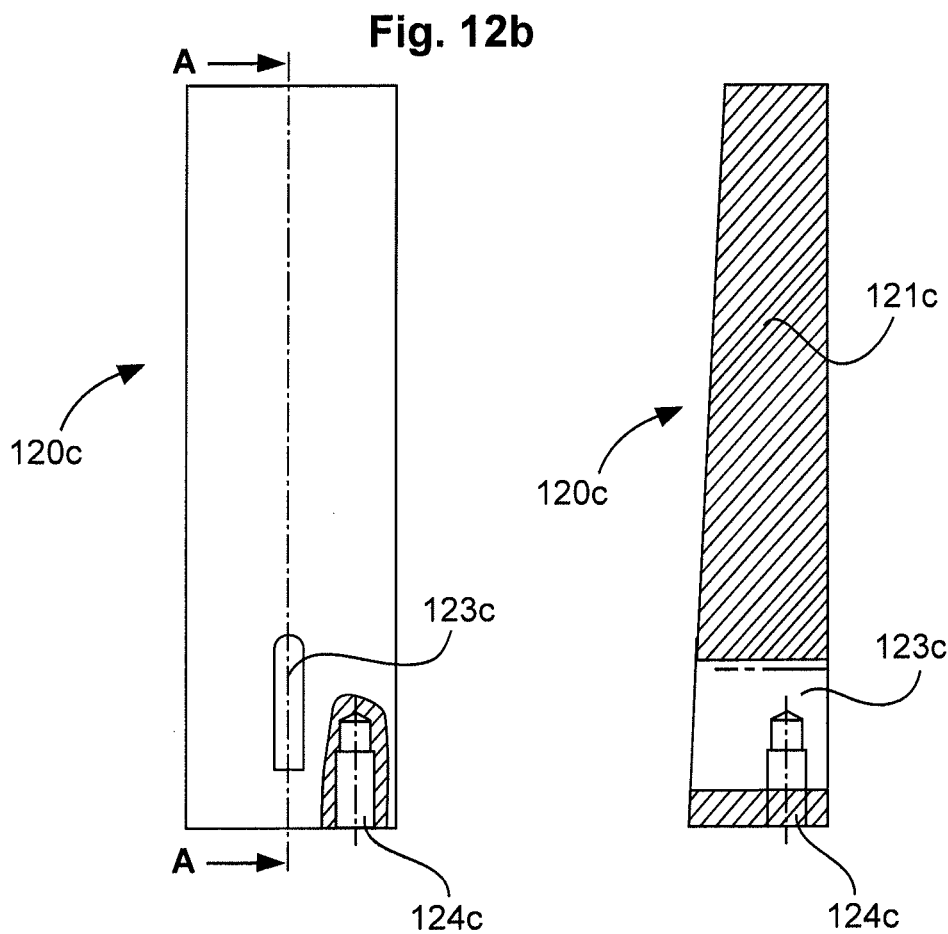
Figure 12D:
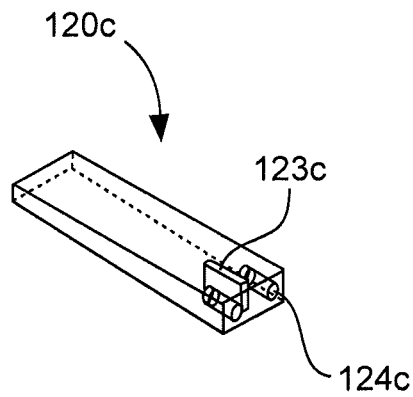

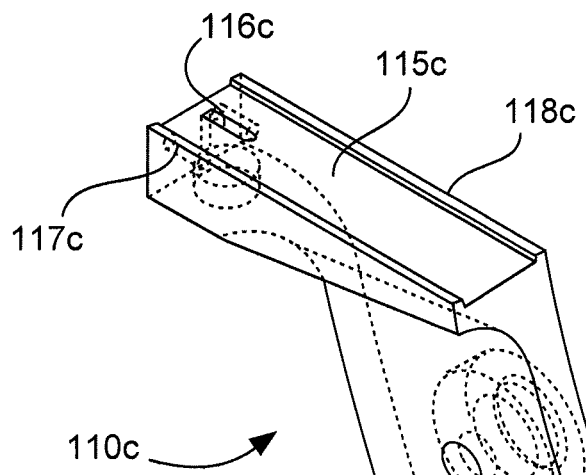
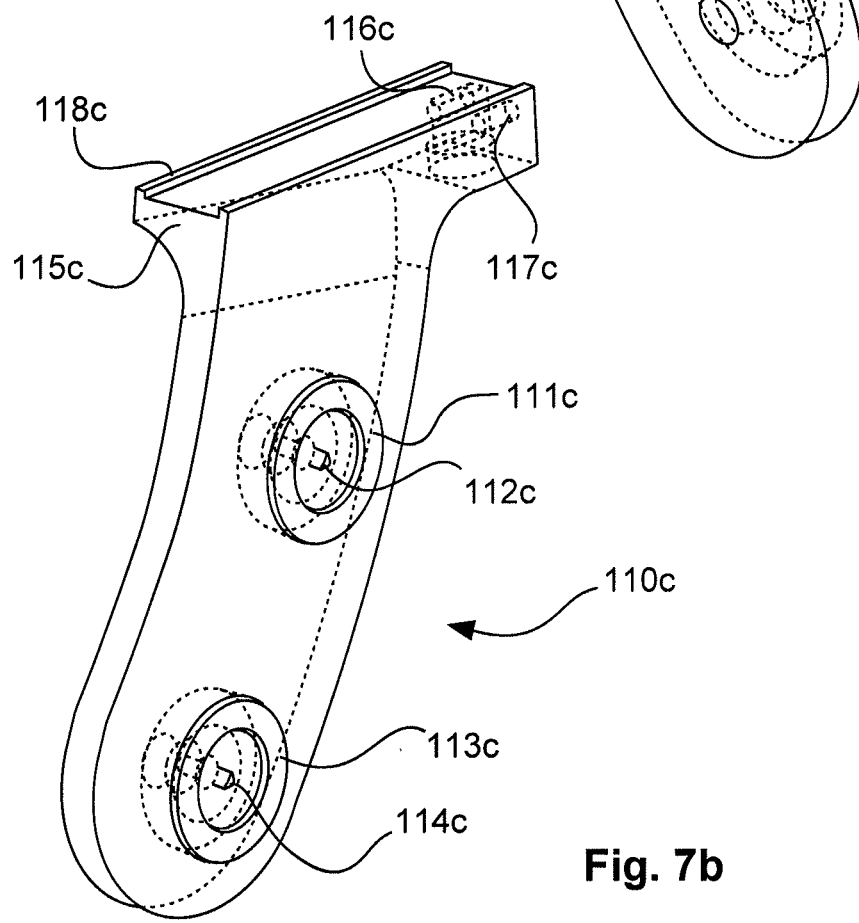
Fig. 7a
Fig. 7b

CROSS SECTION A-A

CROSS SECTION B-B

CROSS SECTION H-H

CROSS SECTION A-A

CROSS SECTION B-B

CROSS SECTION H-H

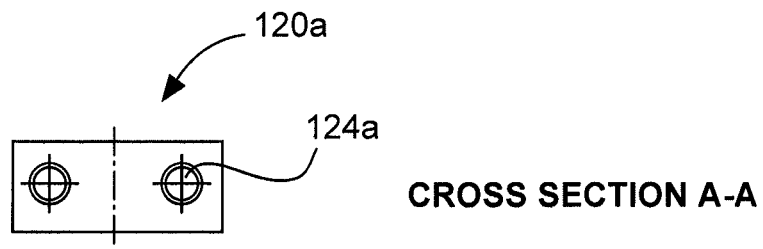
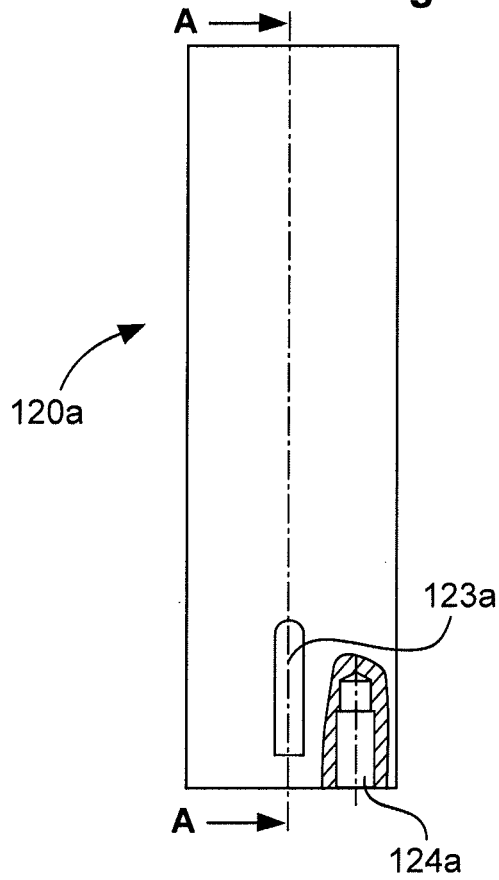
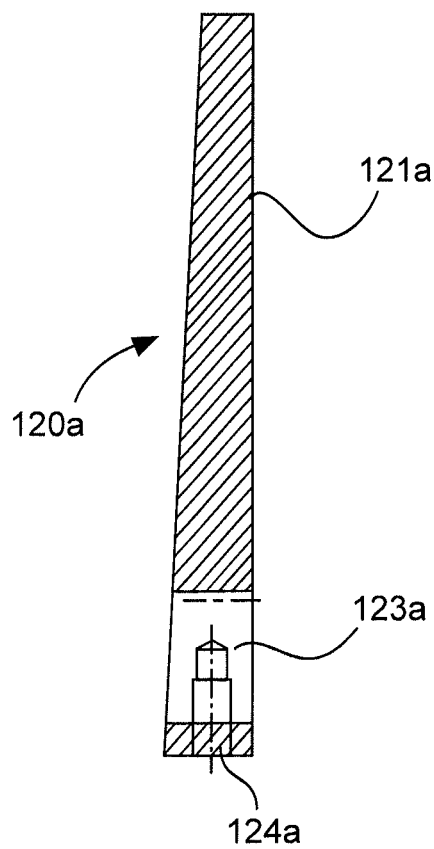
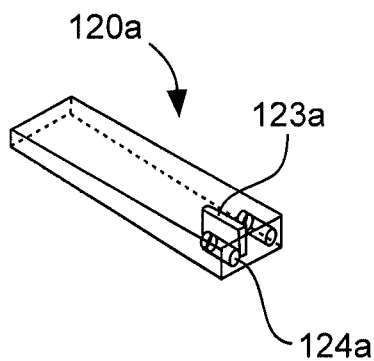
Fig. 9b CROSS SECTION A-A
Fig. 9a
Fig. 9c
Fig. 9d

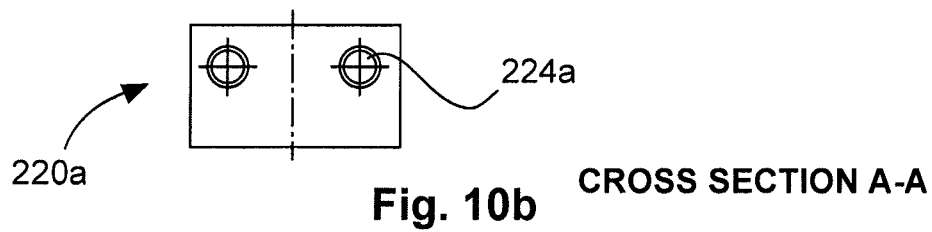
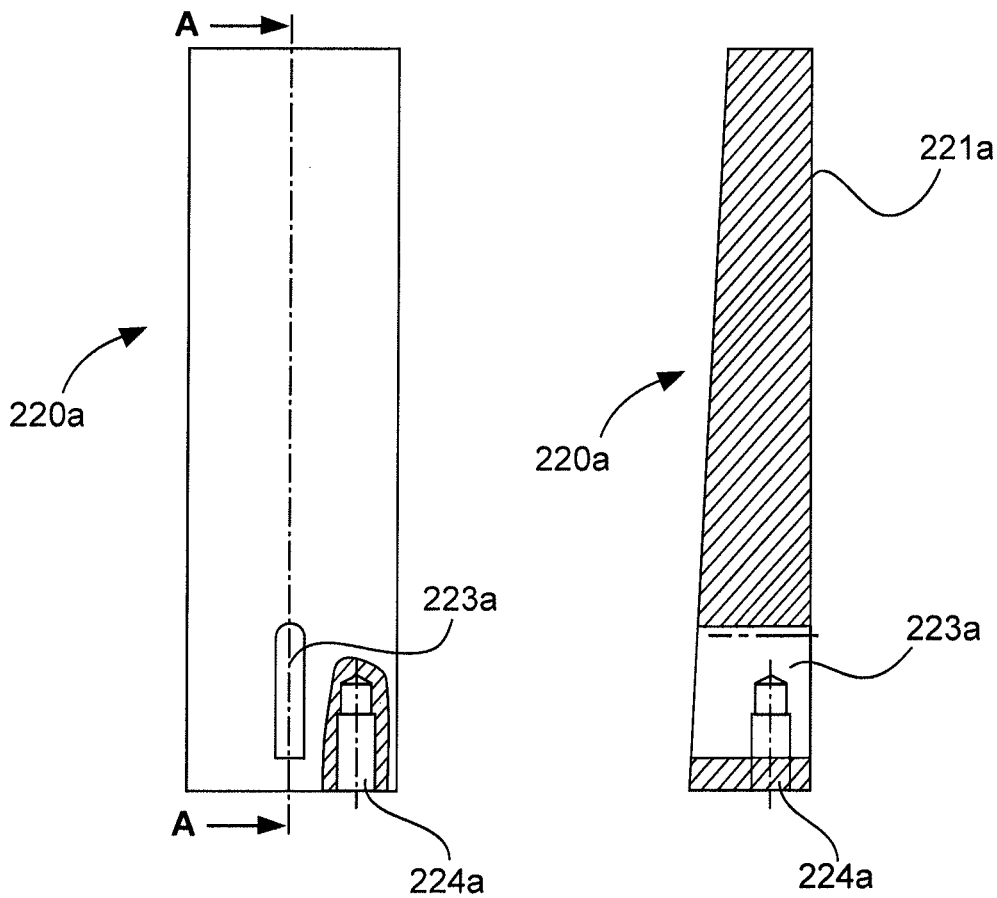
Fig. 10b  CROSS SECTION A-A
Fig. 10a     Fig. 10c
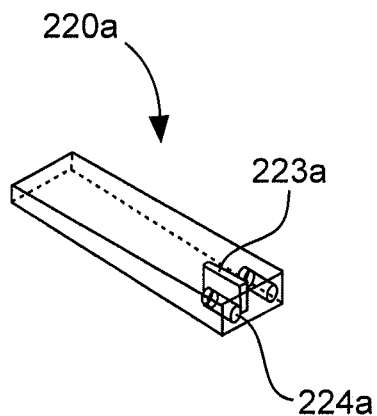
Fig. 10d

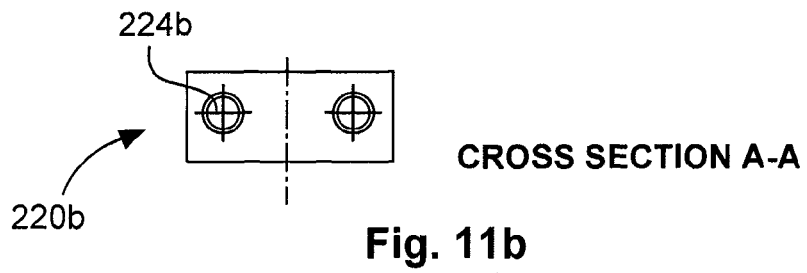
CROSS SECTION A-A
Fig. 11b
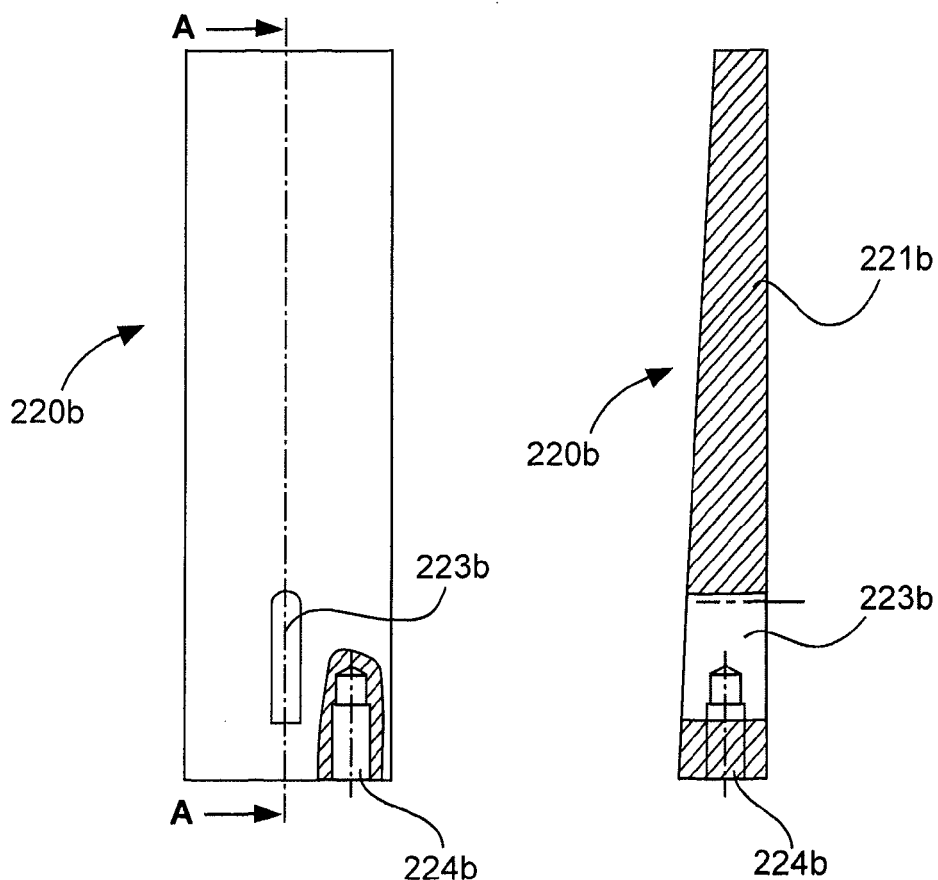
Fig. 11a
Fig. 11c
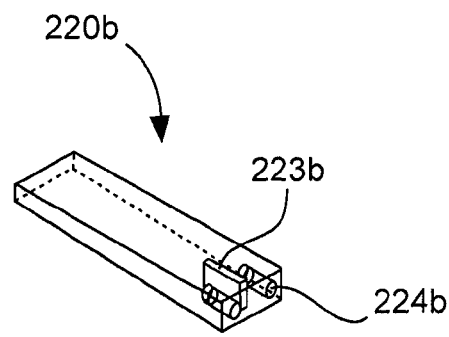
Fig. 11d

CROSS SECTION A-A

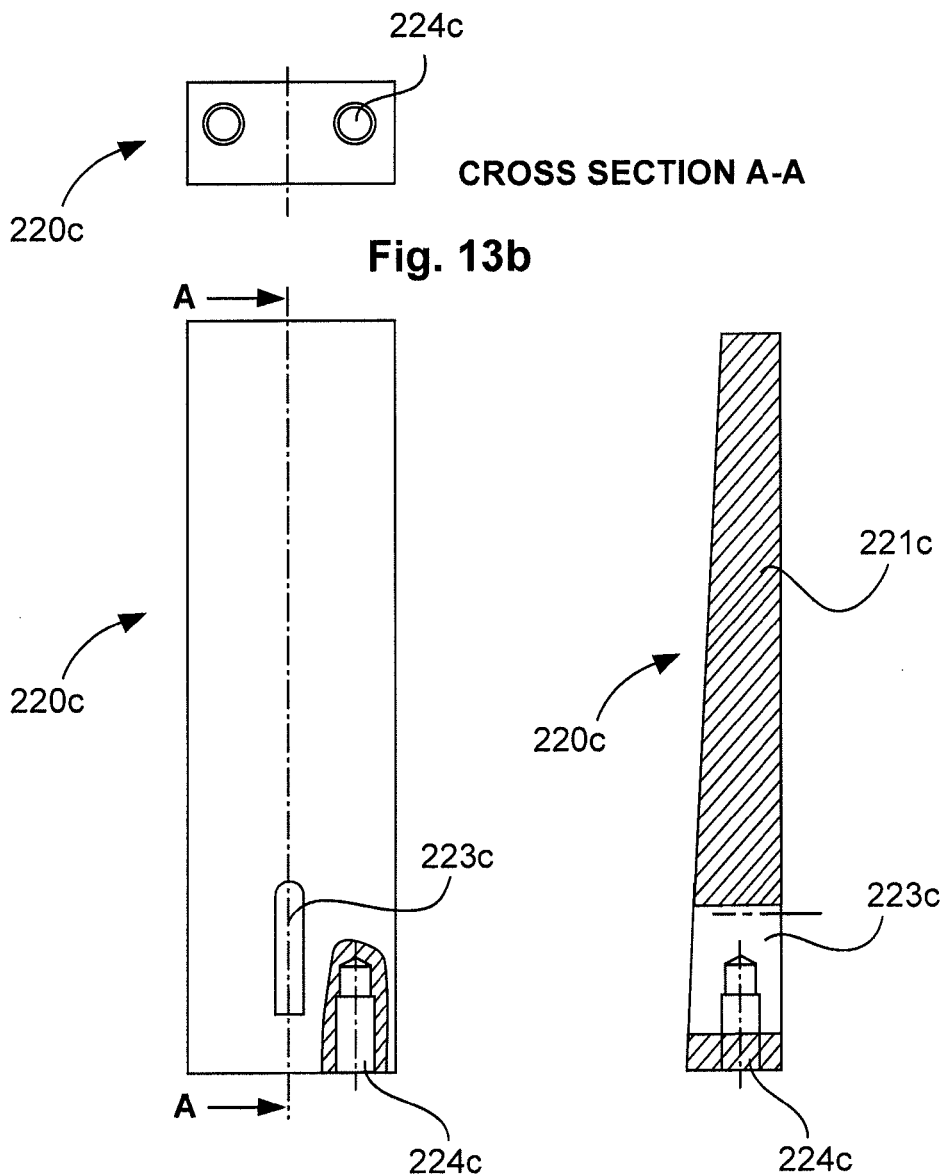
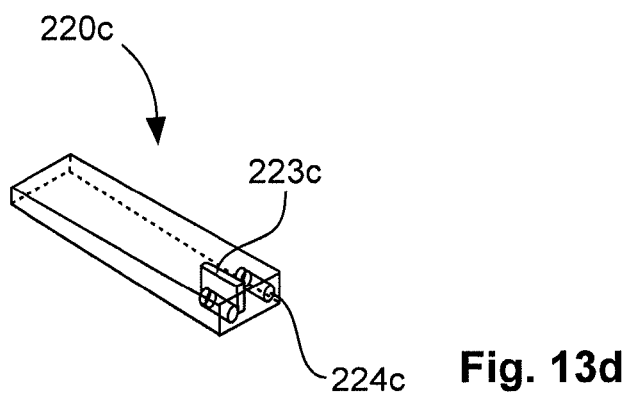

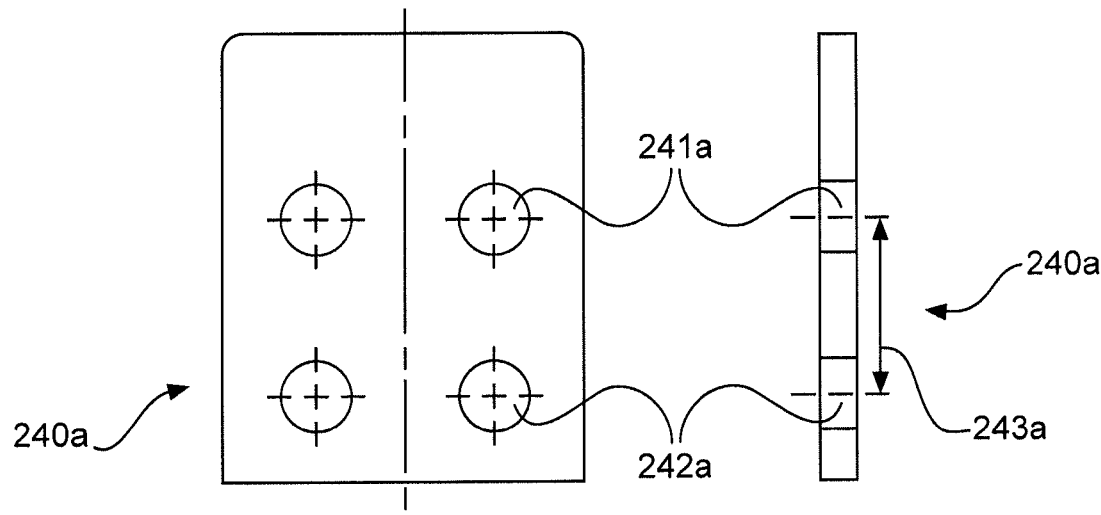
Fig. 15a          Fig. 15b
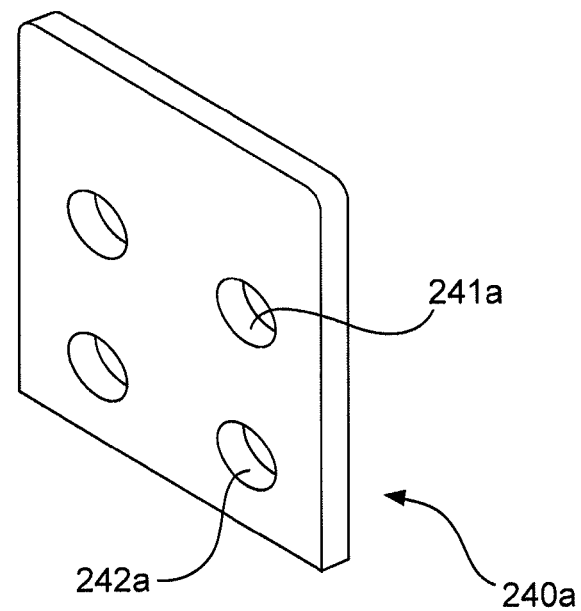
Fig. 15c

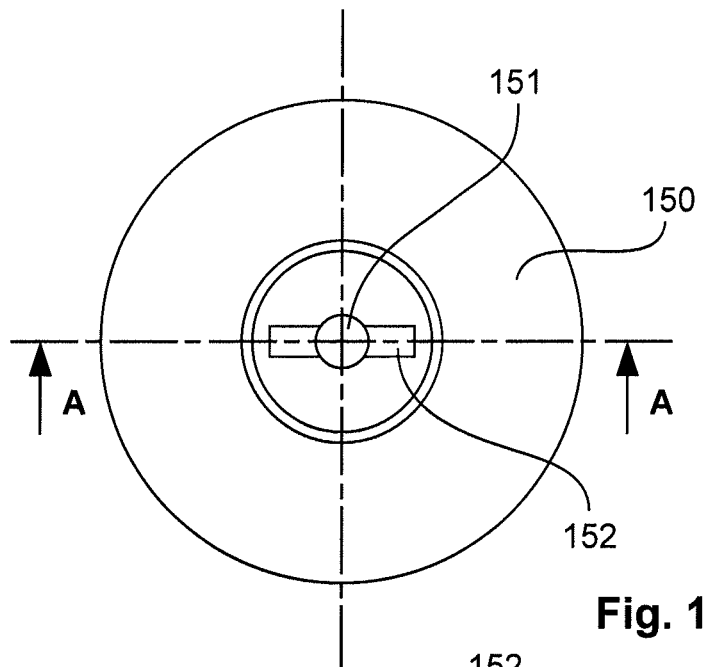
Fig. 19a
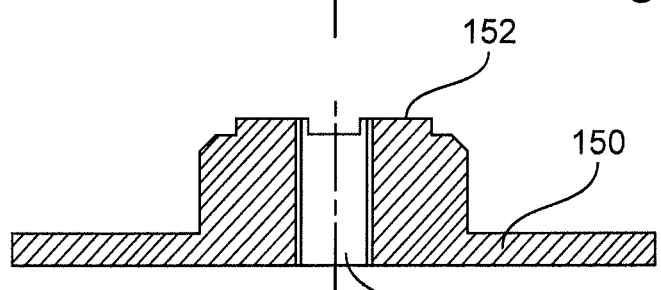
Fig. 19b
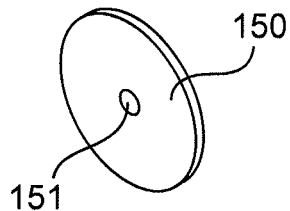
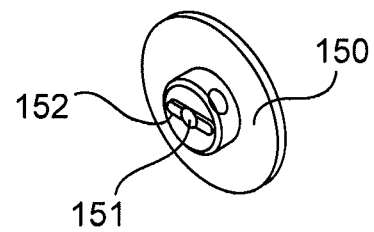
Fig. 19c

ROTOR LOCKING DEVICE AND METHOD FOR LOCKING A ROTOR OF A WIND TURBINE

This application claims the benefit of priority to German Application No. DE 10 2010 039 628.1, filed Aug. 20, 2010, the disclosure of which is herein incorporated by reference.

The invention relates to a mobile rotor locking device for locking a rotor of a wind turbine, the locking device being designed to lock a rotor in such a way that it is prevented from rotating about a horizontal axis, and that a longitudinal axis of a rotor blade is fixed in a vertical plane.

The invention also relates to a kit for a mobile rotor locking device.

The invention further relates to a locking member for a mobile rotor locking device for locking a rotor of a wind turbine.

The invention also relates to a method for locking a rotor of a wind turbine.

It is well known that a wind turbine rotor needs to be temporarily locked, at least for the duration of servicing work, in order to carry out servicing work not only on the blades of a rotor, but also on other components of the wind turbine. This means that the rotor is prevented from rotating in either direction about its rotor axis, which in modern high-power wind turbines is usually horizontal. The wind turbine is thus made to stop so that any components that are still moving during operation of the wind turbine may be safely accessed for servicing purposes.

In the following, "servicing" is specifically understood to mean the maintenance, inspection, cleaning, repair and/or the replacement of components of a wind turbine.

In order to carry out such servicing work, it is necessary that the rotor of a wind turbine be safely and reliably prevented from rotating, in order to prevent any damage occurring to the wind turbine and its components during the servicing work, in which components or parts thereof are dismantled, for example, and for that reason are unable to operate, and to ensure that no harm happens to the persons performing the servicing work.

The rotor of a wind turbine comprises a rotor hub with rotor blades fixed thereto; in the case of modern wind turbines, the number of rotor blades is normally three. It has been found in practice that, in order to carry out servicing work on a rotor blade, it is particularly preferred that the rotor blade being serviced be locked in a "6 o'clock position". In this 6 o'clock position, the longitudinal axis of the blade being serviced is arranged in a vertical plane. This vertical plane comprises a vertical longitudinal axis of the tower of the wind turbine and the horizontal rotational axis of the rotor. When the longitudinal axis of a rotor blade is arranged in this vertical plane, the rotor blade points substantially in the direction of the ground. In the case of a rotor with three rotor blades, when the rotor blade to be serviced is in this 6 o'clock position, the other two blades point slantingly upward in a 2 o'clock and 10 o'clock position, respectively.

It is therefore an object of the present invention to provide a rotor locking device for locking a rotor of a wind turbine, wherein said locking device locks the rotor of a wind turbine safely and reliably, in particular with one rotor blade in the "6 o'clock position". Another object of the present invention is to provide a rotor locking device for locking a rotor of a wind turbine, which improves the safety at work of the persons carrying out the servicing work. Yet another object of the present invention is to provide a rotor locking device for locking a rotor of a wind turbine, which reduces the time needed to carry out servicing work. Another object of the present invention is to provide a rotor locking device for locking a rotor of a wind turbine, which is simple and safe to carry out and/or to install. Yet another object of the present invention is to provide a rotor locking device for locking a rotor of a wind turbine, which is simple and safe to install in and dismantle from a wind turbine, also and particularly in different wind turbines.

Another object of the present invention is to provide a kit for a rotor locking device, an improved locking member and an improved method for locking a rotor of a wind turbine, in accordance with the stated objects of the rotor locking device.

According to the invention, these objects are achieved by a rotor locking device of the kind initially specified, which is characterized in that the rotor locking device is designed to fix a main shaft, on which a rotor is disposed torsionally stiffly, so that it is prevented from rotating about its longitudinal axis.

The rotor of a wind turbine is disposed torsionally stiffly on a main shaft, i.e., there is no gearing between the main shaft and the rotor, and the main shaft rotates at the same speed as the rotor. The main shaft is either coupled directly, that is say without a gearbox, to a synchronous generator operated at the speed of the rotor or, alternatively, the main shaft is coupled via a gearbox, a coupling and a generator shaft to an asynchronous generator, generally to a doubly-fed asynchronous generator which is operated at a speed which is independent of the rotor speed.

The main shaft is rotatably mounted in a base frame, also referred to as the machine base. In addition to the bearings for the main shaft, the base frame also contains bearings for the generator and, where relevant, for the gearbox and the coupling. The base frame and the aforementioned components are disposed in a nacelle of the wind turbine, the nacelle being disposed on top of a tower. Like the rotational axis of the rotor in modern wind turbines, the main shaft extends horizontally in most cases.

It is known from the prior art that, when designing wind turbines, manufacturers provide fixedly installed locking devices for locking the rotor. However, it has been found in practice that the locking devices fixedly installed by manufacturers are not always designed to lock a rotor blade in accordance with requirements. More specifically, it is not possible in some cases to ensure, with the locking devices fixedly installed by manufacturers, that a rotor blade on which servicing work is to be carried out is locked precisely in the preferred 6 o'clock position. This is necessary because a blade inspection vehicle is used for blade servicing, the access platform of which is lowered on ropes from the machine house or nacelle. The blade inspection vehicle rests on rollers against the tower of the wind turbine. However, it is essential that the blade to be serviced is precisely positioned for deployment of the blade inspection vehicle.

For example, there are wind turbines in which the rotor hub is disposed on the main shaft in such a way that it is not possible to lock the rotor with one rotor blade in the 6 o'clock position; instead, the rotor blade pointing downwards can easily be deflected from the 6 o'clock position, for example by up to 15°, when it is locked in place. This may be the case, for example, when an annular perforated disk having 24 recesses spaced 15° apart from each other is disposed between the rotor hub and the main shaft. When a locking device is fixedly installed by the manufacturer, two bolts displaceably mounted in die-cast frames on the base frame engage with two of the recesses in order to lock the perforated disk—and hence also the rotor and the main shaft. However, depending on the position of the bolts and the way that the rotor hub is mounted on the perforated disk, the blade can be disadvantageously deflected out of the 6 o'clock position, as described above.

It is therefore necessary to lock the rotors of wind turbines in precisely the 6 o'clock position by means of mobile rotor locking devices, rather than locking them using the devices provided by manufacturers. Mobile rotor locking devices can be installed later and temporarily for the duration of servicing work on a wind turbine and subsequently dismantled again. Preferably, the mobile rotor locking devices can then be transported to other wind turbines and deployed there temporarily.

In mobile rotor locking devices of the kind known to date, it is the generator shaft between the generator and the gearbox that is locked, because the torques to be handled are lower as a result of the gear transmission ratio of the gearbox.

However, the invention is based on the realization that substantial advantages can be achieved by departing from the locking devices commonly used in the prior art. Several disadvantages ensue from locking the generator shaft between the gearbox and the generator, in the manner known from the prior art. Firstly, that solution needs to be improved with regard to safety at work, in that damage to the gearbox, for example, may lead to the main shaft and hence also the rotor rotating, despite the generator shaft being securely locked, thus causing injury to a person working on the rotor, for example, or components of the wind turbine being damaged. In order to lock the generator shaft, it is also necessary to dismantle the gear coupling, which has to be done by specially trained technicians. Technicians specialized in repairing rotor blades are not usually trained to dismantle gear couplings in a wind turbine, and vice versa. This means that a specialist or team of technicians firstly dismantles the gear coupling and locks the generator shaft, before a specialist or team for rotor servicing can subsequently carry out the relevant rotor servicing work. The specialist or team of technicians must then be deployed to remove the generator shaft lock and to reinstall the coupling.

The solution according to the invention, in contrast, stipulates that the main shaft—and hence also the rotor disposed torsionally stiffly on the main shaft—be locked directly, which means that safe and precise locking is independent of the gearbox. The invention thereby overcomes the prejudiced view that mobile rotor locking devices, in contrast to the fixedly installed locking devices provided by manufacturers, are not suitable for locking the main shaft due to the high levels of torque that occur there, given that mobile rotor locking devices must be smaller and lighter to be transportable, and for that reason cannot be sufficiently dimensioned to cope with the prevailing torque levels on the main shaft.

The solution according to the invention has the advantage that it saves the time involved, and the need to deploy specialists twice, in order to dismantle and install the coupling, since there is no need to dismantle the coupling when the main shaft is locked.

The solution according to the invention also helps to increase safety at work, since the main shaft on which the rotor is torsionally stiffly mounted is locked directly, with such locking being independent of the torque coupling via the gearbox and hence independent of any possible damage to the transmission. Although larger torques must be handled in order to lock the main shaft and heavier, appropriately configured locking members must therefore be provided, this disadvantage is more than offset by the aforementioned advantages, firstly, and secondly is reduced by the design of the present invention, also and particularly in the preferred developments and embodiments described below.

The invention may be developed by having the rotor locking device include a first and a second locking member.

Two locking members mounted at two different places on the main shaft are preferably provided, which means there are two points of engagement for locking the rotor. This has the advantage, firstly, that the mobile rotor locking device is simple to transport and to install/dismantle, since two locking members, which can be designed to be smaller and lighter than a single locking member are better to handle. Providing two locking members also increases the reliability of rotor locking, because if one locking member malfunctions or fails, the second locking member—if appropriately dimensioned—can ensure locking of the rotor independently of the first locking element (at least for a specific period).

The invention can also be developed by designing the first locking member to fix a main shaft so that it is prevented from rotating about its longitudinal axis in a first direction, and by designing the second locking member to fix a main shaft to prevent it from rotating about its longitudinal axis in a second direction opposite to the first.

A particularly preferred embodiment is one in which the two locking members have different locking functions, namely to fix the rotor with respect to different directions of rotation. This facilitates installation/dismantling of the rotor locking device and also allows the locking members to have a particularly simple design. This means that no specialists are needed to install/dismantle the rotor locking device—unlike installation/dismantling of a coupling and a locking device that fixes the generator shaft, i.e., the rotor locking device can be installed and dismantled by persons who carry out rotor blade servicing.

The invention can be developed by providing each of the two locking members with an attachment device for attaching the locking member to a main shaft, and a contact surface for transferring compressive forces to a stationary base frame.

The locking members are preferably releasably attached to the main shaft by means of attachment devices, for example with nuts and by bolting them. It is preferred, more particularly, that the locking members can be attached to a perforated disk by means of the attachment devices, the attachment device of each locking member preferably engaging with two holes of the perforated disk.

It is not necessary in this development of the invention to attach the locking members to the stationary base frame of the wind turbine, since each locking member prevents rotation of the rotor in one direction only, which is effected by compressive force being transferred via the stop member of the contact surface to a counter-surface on the base frame. Rotation of the rotor in the opposite direction would be possible if there were only one locking member. However, due to the transfer of compressive force by the stop member of the contact surface of the second locking member to another counter-surface on the base frame prevents rotation in the opposite direction, the rotor is fixed in both directions of rotation. Existing die-cast frames of fixing bolts are preferably used as counter-surfaces on the base frame, since these provide suitable engagement surfaces for a stop member of the contact surface of the locking member. However, it is also possible to use suitable other counter-surfaces on the base frame.

This development of the invention facilitates installation/dismantling even further, since it is only necessary to attach the locking members to the main shaft, preferably to the perforated disk, thus obviating the need for additional attachment to the base frame—with respective matching fits.

Alternatively, the invention may be developed by providing each of the two locking members with an attachment device for attaching the locking member to a stationary base frame, and with a contact surface for transferring compressive forces to a main shaft.

Another alternative development of the invention consists in one of the two locking elements being provided with an attachment device for attaching the locking member to a stationary base frame, and with a contact surface for transferring compressive forces to a main shaft, and the other of the two locking elements having an attachment device for attaching the locking member to a stationary base frame, and with a contact surface for transferring compressive forces to a main shaft.

The principle, described in the foregoing, of attaching the locking members to the main shaft and stop member to the base frame can also be applied conversely, with attachment of the locking member to the base frame and a stop member to the main shaft. The two principles may also be combined, such that one locking member is designed according to the one principle and the other locking member designed according to the other principle. The advantages of the basic principle apply equally for all designs, however. The different variants can be specifically advantageous when the rotor locking device is used for different types of wind turbine. In wind turbines with a profiled or slotted main shaft, for example, a respective contact surface may be provided for engagement with the profile of, or slot in the main shaft.

The invention may be developed by having each of the two locking members comprise a base plate and a fixing wedge, the fixing wedge preferably having a recess for receiving a connecting wedge.

This development of the invention is a preferred further simplification of the rotor locking device according to the invention. To be able to lock the rotor exactly in the 6 o'clock position, very different geometries of the locking members may be necessary, depending, for example, on how the rotor hub is mounted on the main shaft, or how the counter-surfaces are arranged on the base frame, or how the points of engagement for the attachment devices are arranged on the main shaft. The variability of the locking elements is increased by designing them with a base plate and a fixing wedge. For example, a plurality of differently designed fixing wedges may be provided, from which one which is suitable for the respective situation is selected and combined with a base plate to form a locking member. A plurality of base plates of differing dimensions may also be provided, so that the rotor locking device suitable for the respective situation can be selected and/or assembled from a respective combination of two base plates with two fixing wedges.

It is also preferred that the attachment device be formed on the base plate and the contact surface on the fixing wedge. In this way, the base plate can firstly be attached, and the fixing wedge subsequently attached to and/or oriented on the base plate, preferably by means of a connecting wedge. To this end, the base plate preferably has a stop portion which preferably also has a recess for receiving a connecting wedge. In this development of the invention, the fixing wedge is disposed on the stop portion of the base frame and is connected to the base plate and/or oriented relative thereto via a connecting wedge which preferably engages both with a recess in the fixing wedge and with a recess in the base plate.

The invention may be developed by providing each locking member with a connecting plate designed to connect the base plate and the fixing wedge of the first and second locking member respectively to each other.

In this way, it is possible to ensure a secure connection between the base plate and the fixing wedge, which is necessary to guarantee a defined geometry of the locking member and hence the exact alignment of the rotor blade in the 6 o'clock position.

The invention may be developed by giving the second locking member different dimensions from those of the first locking member.

Depending on the conditions under which the mobile rotor locking device is deployed, for example depending on how the rotor hub is mounted on the main shaft, or how the counter-surfaces are arranged on the base frame, or how the points of engagement for the attachment devices are arranged on the main shaft, it may be advantageous to provide different geometries for the two locking members, rather than to design them as mirror images of each other, in order to permit a rotor blade to be aligned exactly in the 6 o'clock position. These different geometries may be achieved with differing designs for the base plate, the fixing wedge, the connecting plate, the connecting wedge or for a combination of these various components.

Another aspect of the invention concerns a kit for a mobile rotor locking device for locking a rotor of a wind turbine, as previously described, characterized in that the kit has two or more different locking members comprising preferably two or more different base supporting plates and/or two or more different fixing wedges and/or two or more different connecting plates.

This inventive kit has the advantage that a large number of different locking elements adapted to the respective conditions of use can be formed with a relatively small number of components, and hence that a large number of rotor locking devices can be provided for different purposes. This makes it easier to transport the mobile rotor locking device from one wind turbine to the next.

The components, in particular the locking members of the kit according to the invention can be developed according to the developments of the mobile rotor locking device described in the foregoing. These developments of the kit have features that make them specifically suitable for providing rotor locking devices according to the invention and the various developments thereof. With regard to the embodiments, specific features, variants and advantages of the features of said kit and the developments thereof, reference is made to the above description of the respective features of the mobile rotor locking device.

Another aspect of the invention concerns a locking member for a mobile rotor locking device for locking a rotor of a wind turbine, characterized in that the locking member is designed to fix a main shaft so that it is prevented from rotating about its longitudinal axis in one direction.

The locking member according to the invention can be developed by designing it to fix a main shaft so that the main shaft is prevented from rotating about its longitudinal axis in a first direction. Alternatively, the locking member according to the invention can be developed by designing it to fix a main shaft so that the main shaft is prevented from rotating about its longitudinal axis in a second direction opposite to the first.

The locking element according to the invention may be developed by providing it with an attachment device for attaching the locking member to a main shaft, and a contact surface for transferring compressive forces to a stationary base frame.

Alternatively, the locking element according to the invention may be developed by providing it with an attachment device for attaching the locking member to a stationary base frame, and with a contact surface for transferring compressive forces to a main shaft.

The locking element according to the invention may be developed by providing it with a base plate and a fixing wedge, the fixing wedge preferably having a recess for receiving a connecting wedge.

The locking element according to the invention may be developed by providing the base plate with a stop portion that preferably has a recess for receiving a connecting wedge.

The locking element according to the invention may be developed by providing it with a connecting plate designed to connect the base plate and the fixing wedge to each other.

These developments of the locking elements have features that make them specifically suitable for use with a rotor locking device according to the invention and with the various developments thereof. With regard to the embodiments, specific features, variants and advantages of the features of said locking element and the developments thereof, reference is made to the above description of the respective features of the mobile rotor locking device.

Another aspect of the invention concerns a method for locking a rotor of a wind turbine, said method comprising the steps of providing a mobile rotor locking device, and locking a rotor in such a way that it is prevented from rotating about a horizontal axis and a longitudinal axis of a rotor blade is fixed in a vertical plane, the method being characterized in that the locking step includes fixing a main shaft, on which a rotor is disposed torsionally stiffly, to prevent it from rotating about its longitudinal axis.

The method according to the invention may be developed by having the step of fixing a main shaft comprise the following steps: Fixing a main shaft so that it is prevented from rotating about its longitudinal axis in a first direction, and fixing a main shaft so that it is prevented from rotating about its longitudinal axis in a in second direction opposite to the first.

The method according to the invention may be developed by the steps of: Fixing a first and a second locking member to a main shaft and providing a respective contact surface for transferring compressive forces to a stationary base frame at each of the two locking members.

Alternatively, the method according to the invention may be developed by the steps of: Fixing a first and a second locking member to a stationary base frame and providing a respective contact surface for transferring compressive forces to a stationary base frame at each of the two locking members.

Another alternative development of the method is characterized by the steps of: Fixing one of the two locking elements to a main shaft and providing a contact surface for transferring compressive forces to a stationary base frame at said locking element, and fixing the other of the two locking elements to a stationary base frame and providing a contact surface for transferring compressive forces to a main shaft at said locking element.

The method according to the invention may be developed by the step of providing a fixing wedge having a contact surface.

The method according to the invention may be developed by the step of fixing and/or aligning the fixing wedge at a stop portion of the base plate preferably by means of a connecting wedge.

The method according to the invention may be developed by the step of connecting the base plate to the fixing wedge by means of a connecting plate.

The method according to the invention may be developed by the step of providing two locking members having different dimensions.

These developments of the method have features or steps that make them specifically suitable for use with a rotor locking device according to the invention and with the various developments thereof. With regard to the embodiments, specific features, variants and advantages of the features of said method and the developments of said method, reference is made to the above description of the respective features of the mobile rotor locking device.

Figure 1:
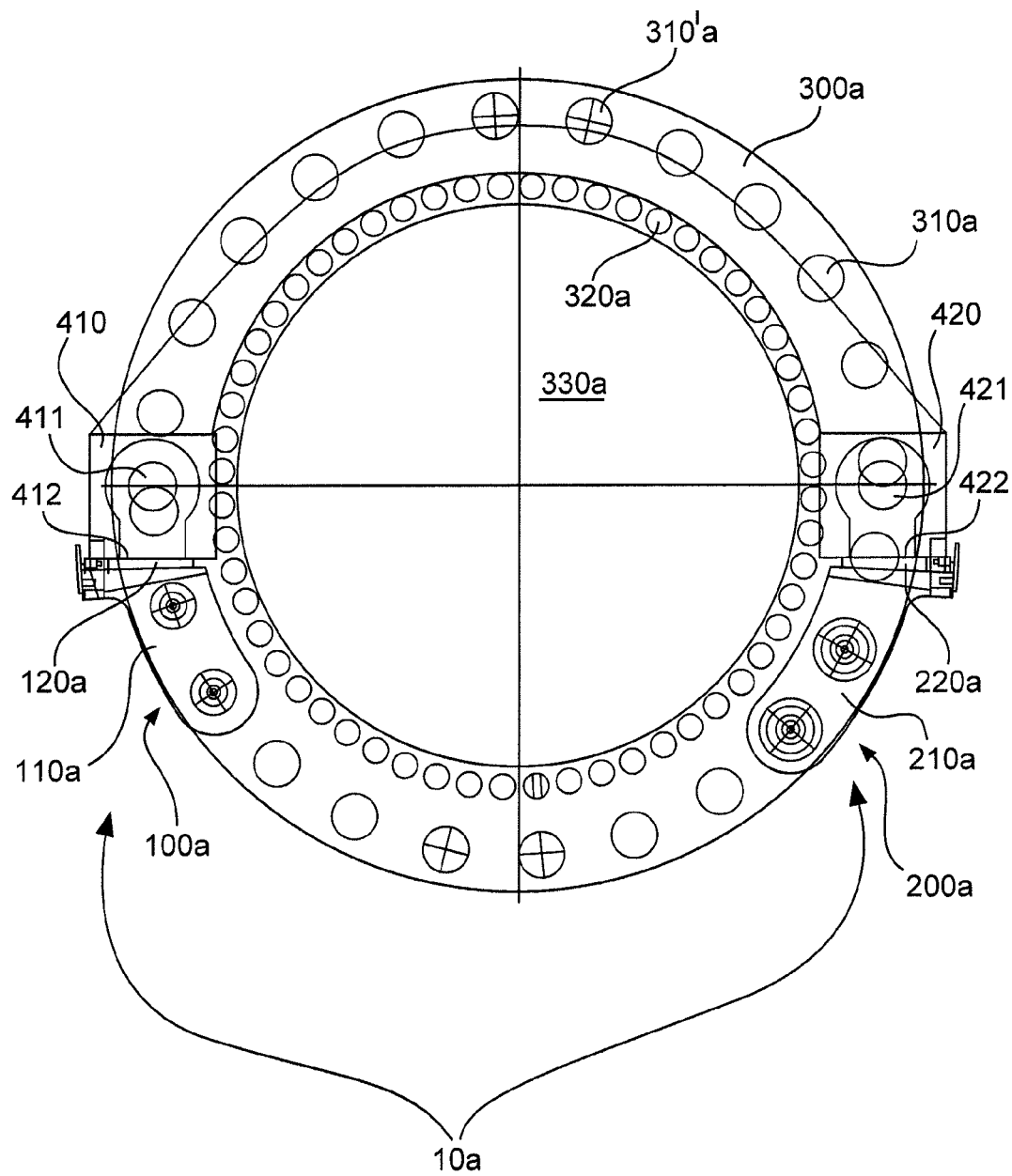
Figure 2A:
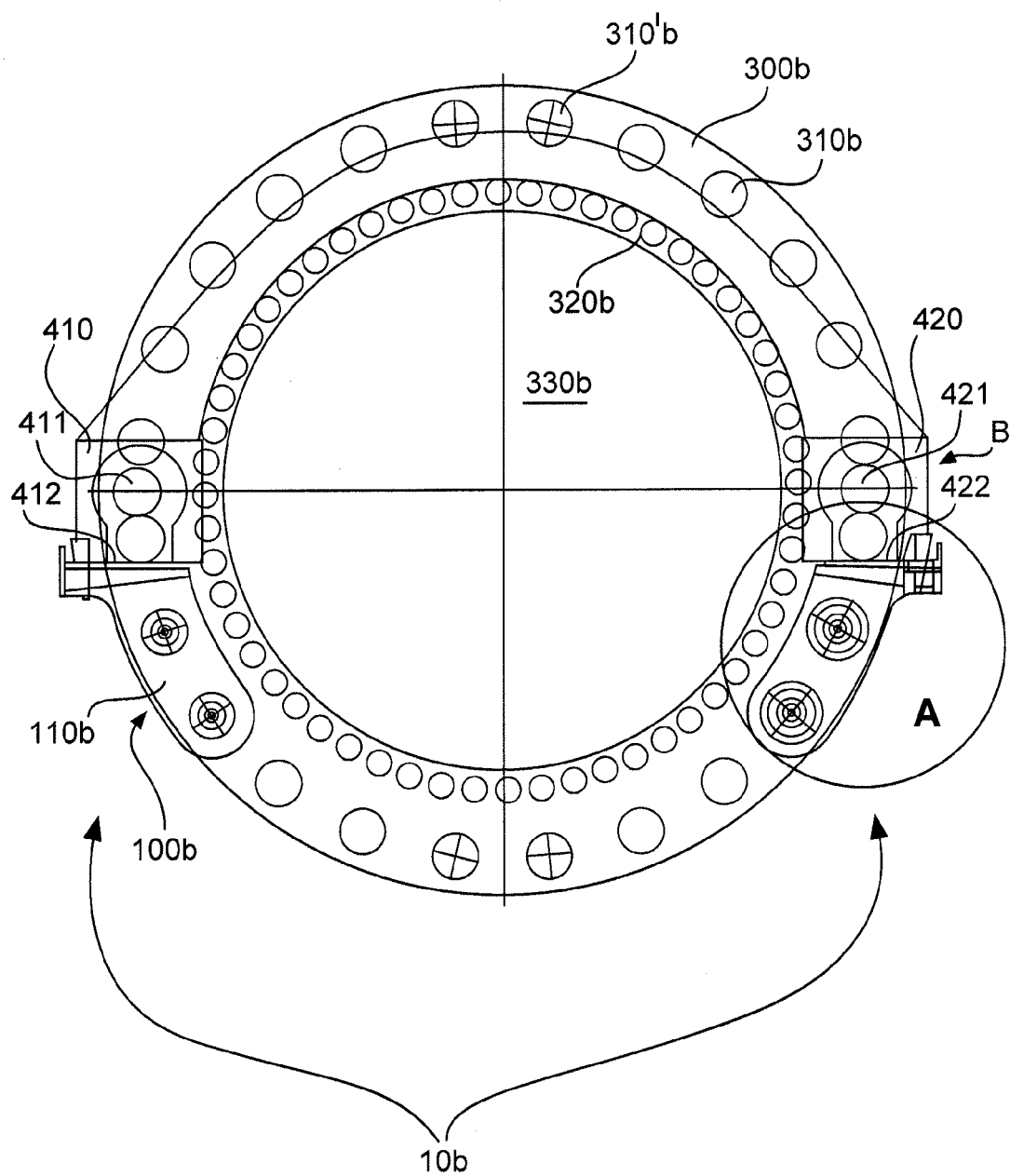
Figure 2B:
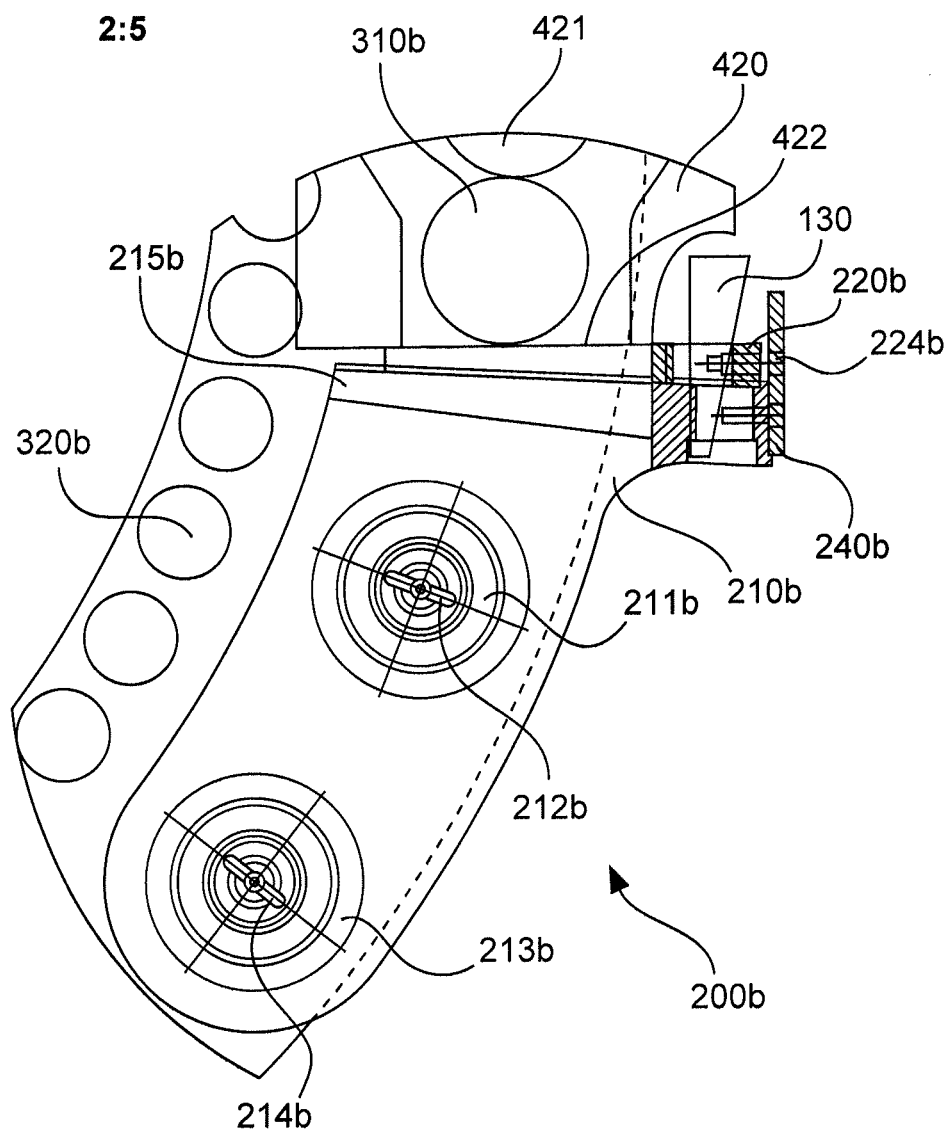
Figure 2C:
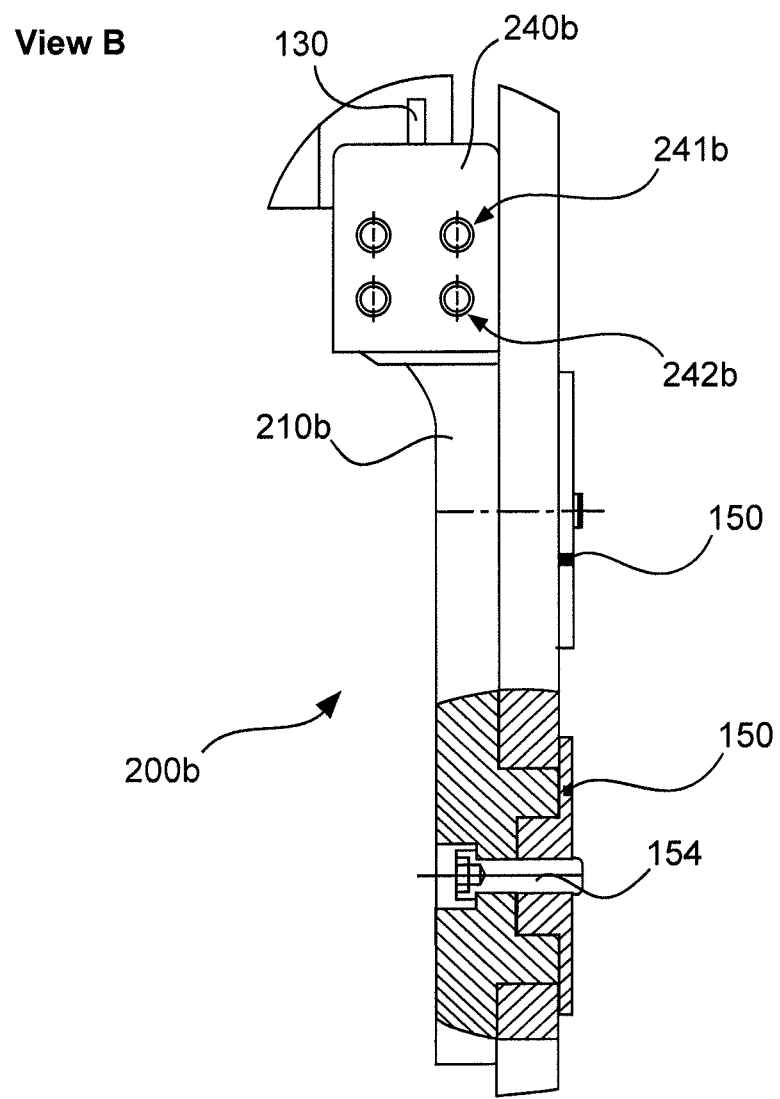
Figure 3:
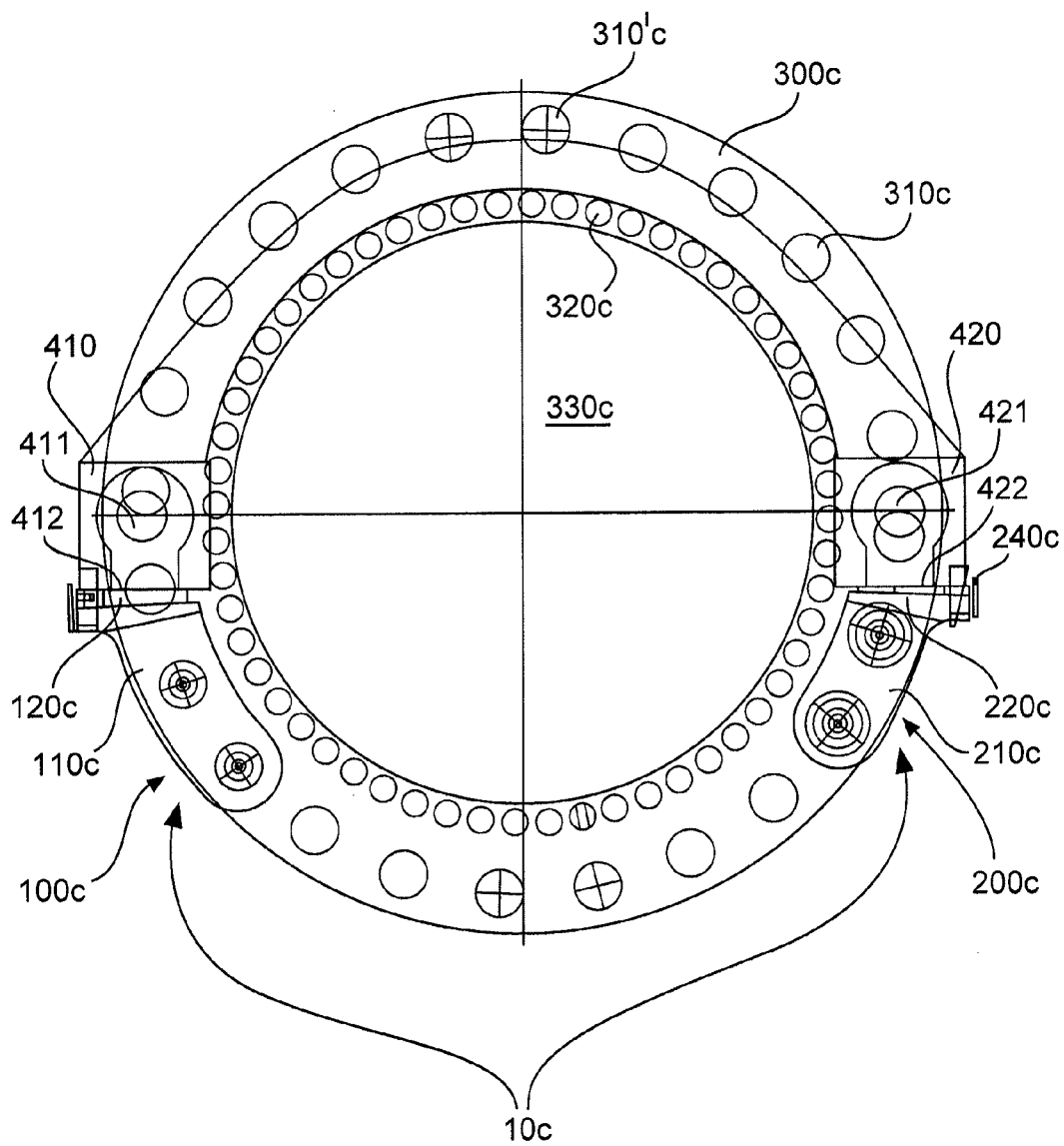
Figure 4A:
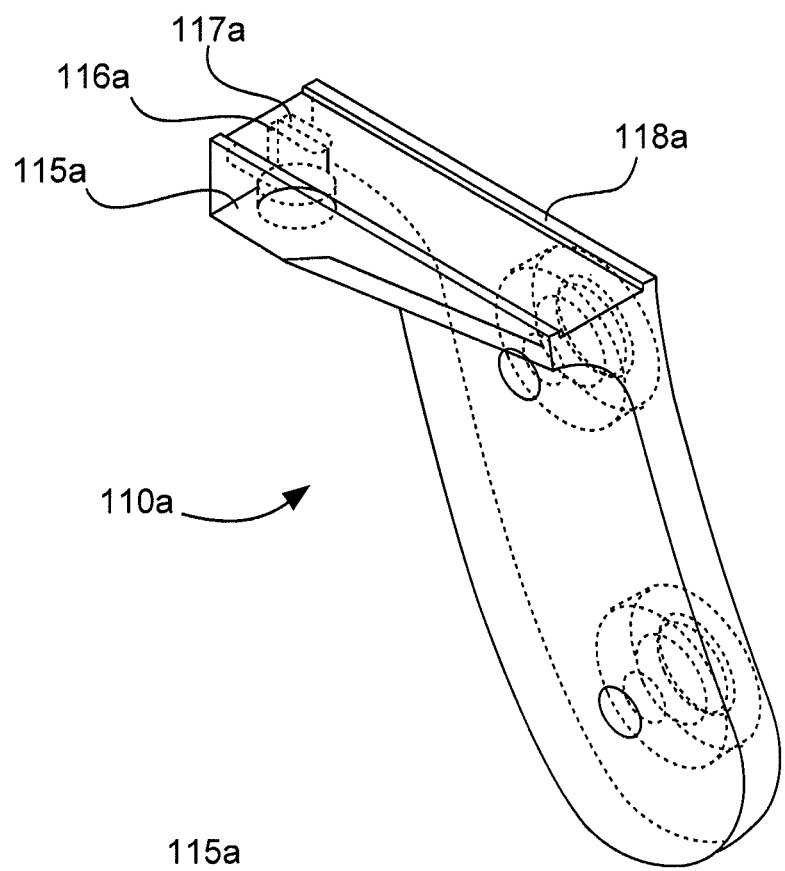
Figure 4B:
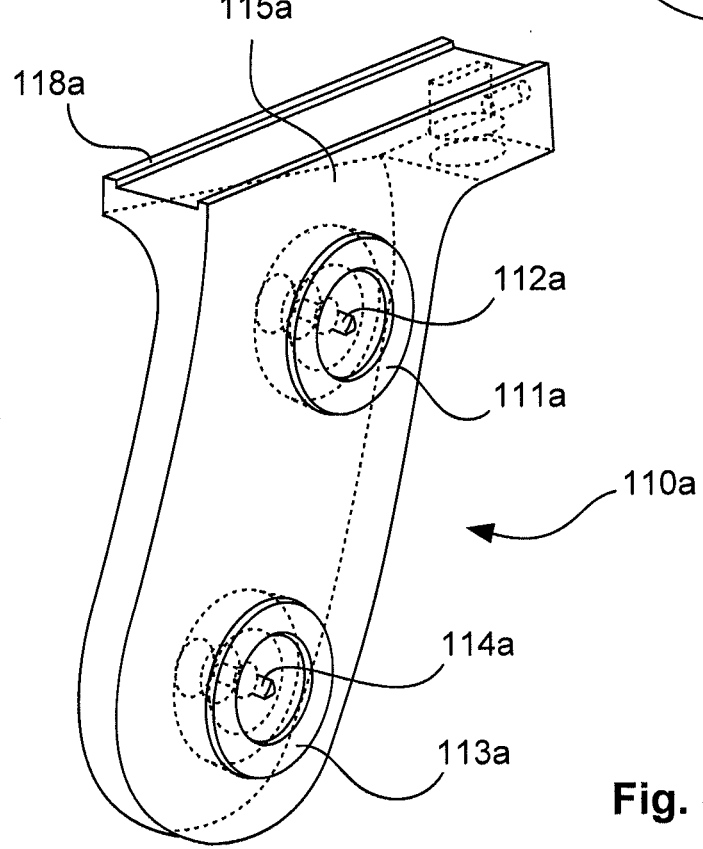
Figure 4C:
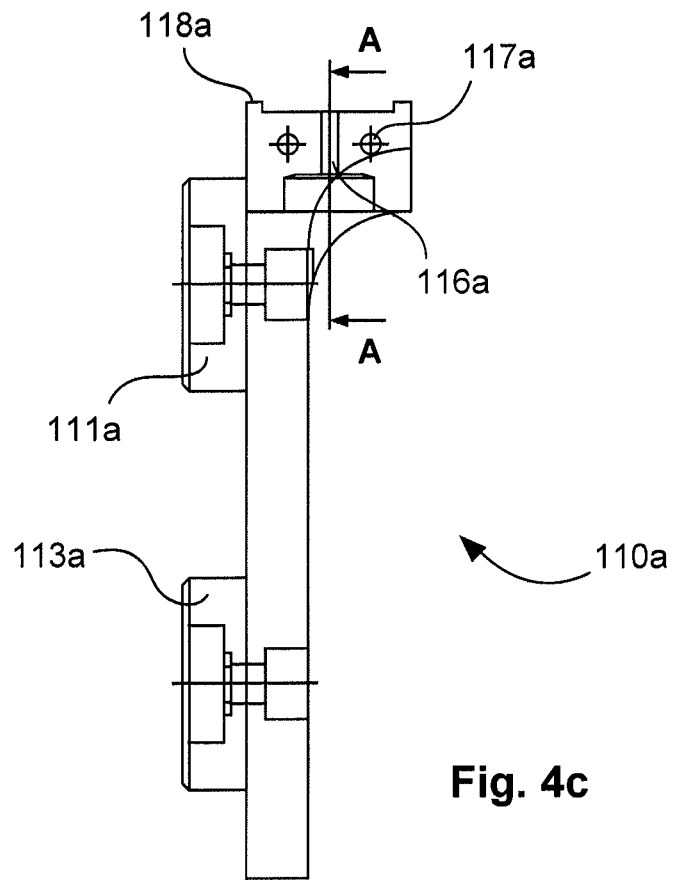
Figure 4D:
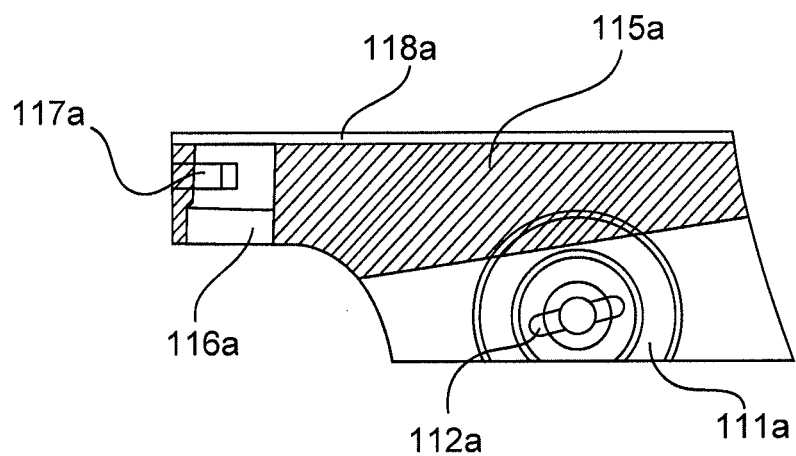
Figure 4E:
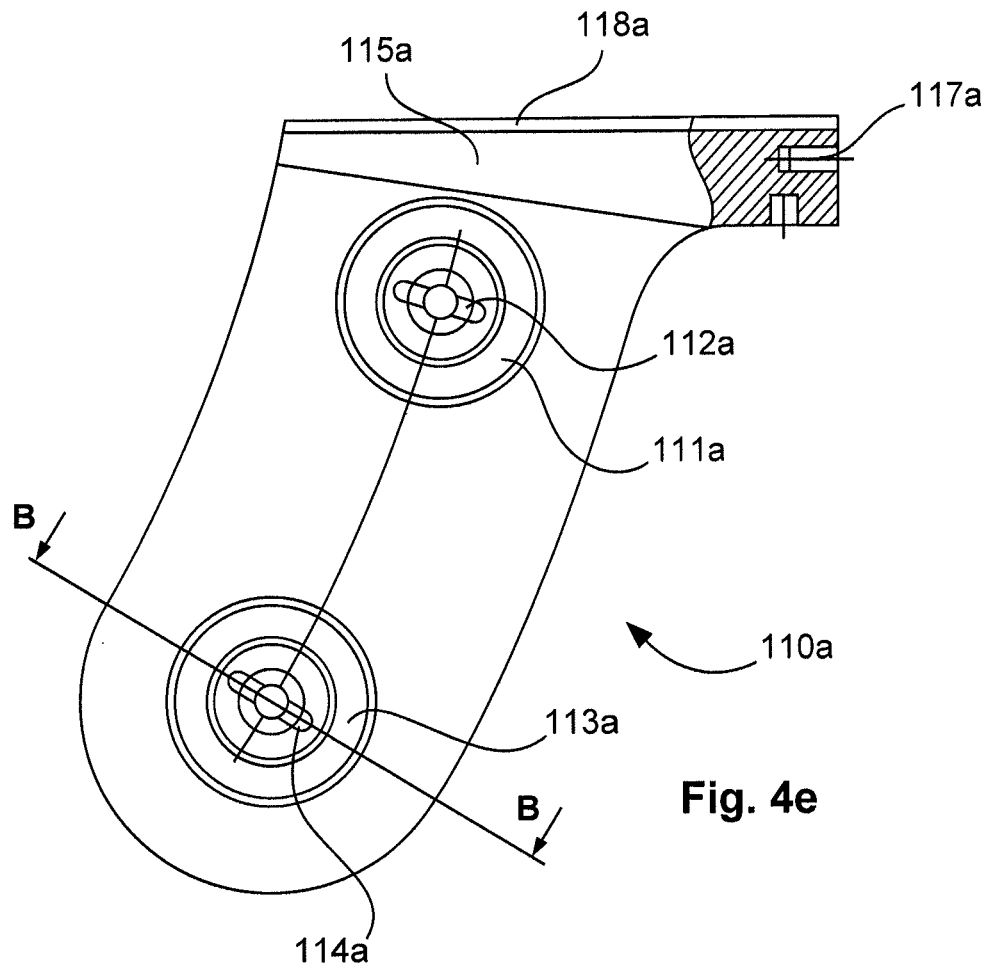
Figure 4F:
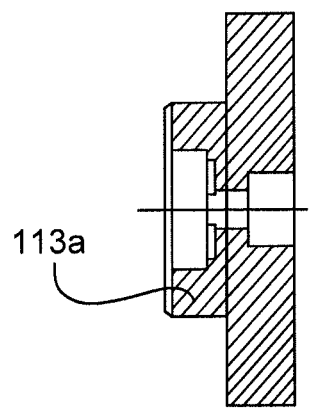
Figure 4G:
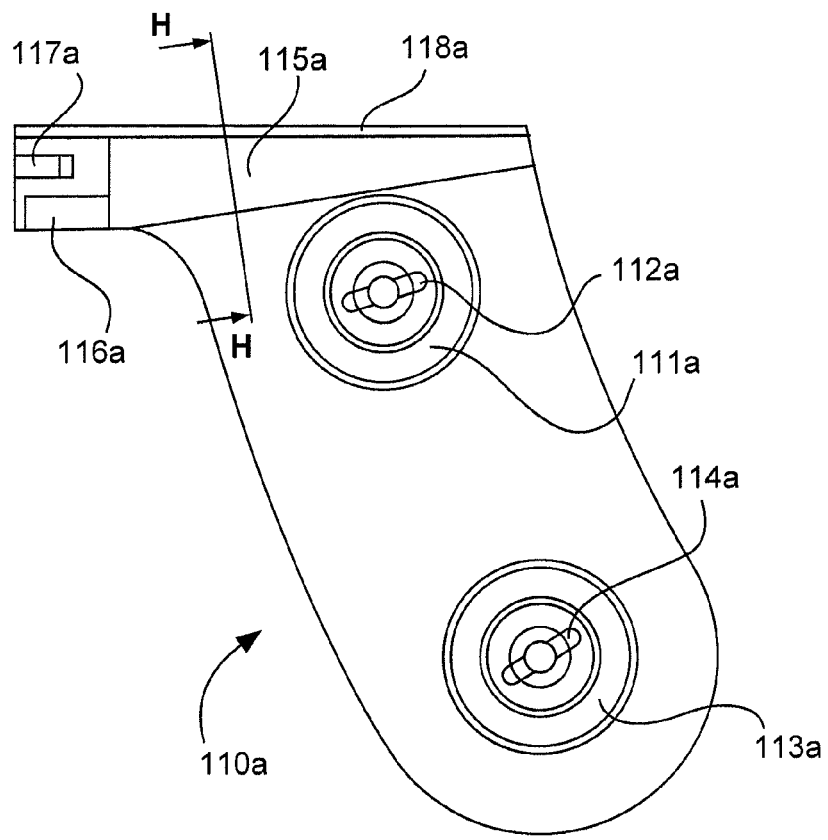
Figure 4H:
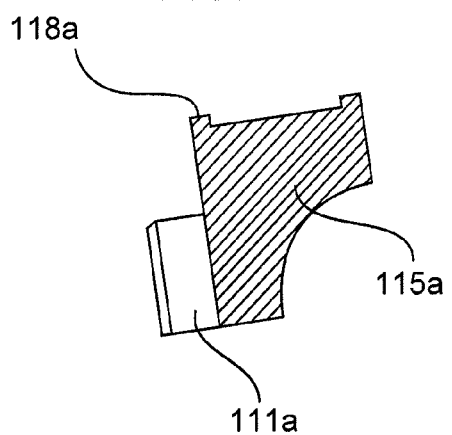
Figure 4I:
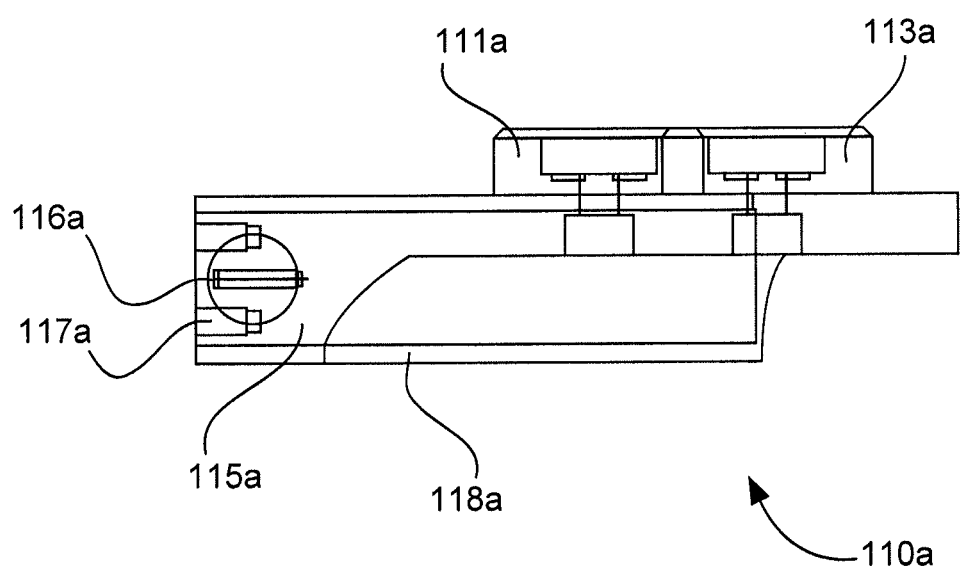
Figure 4J:
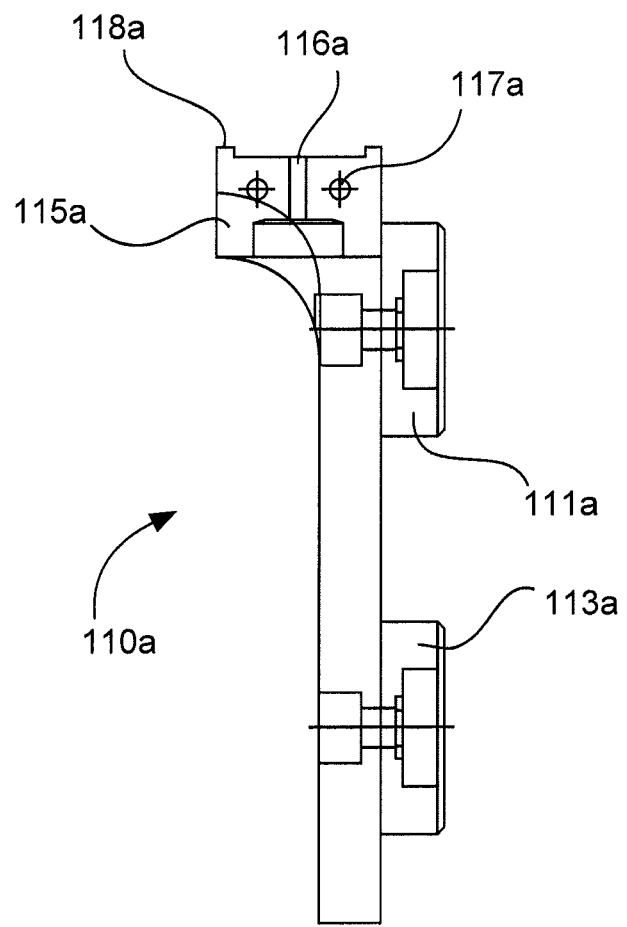
Figure 5A:
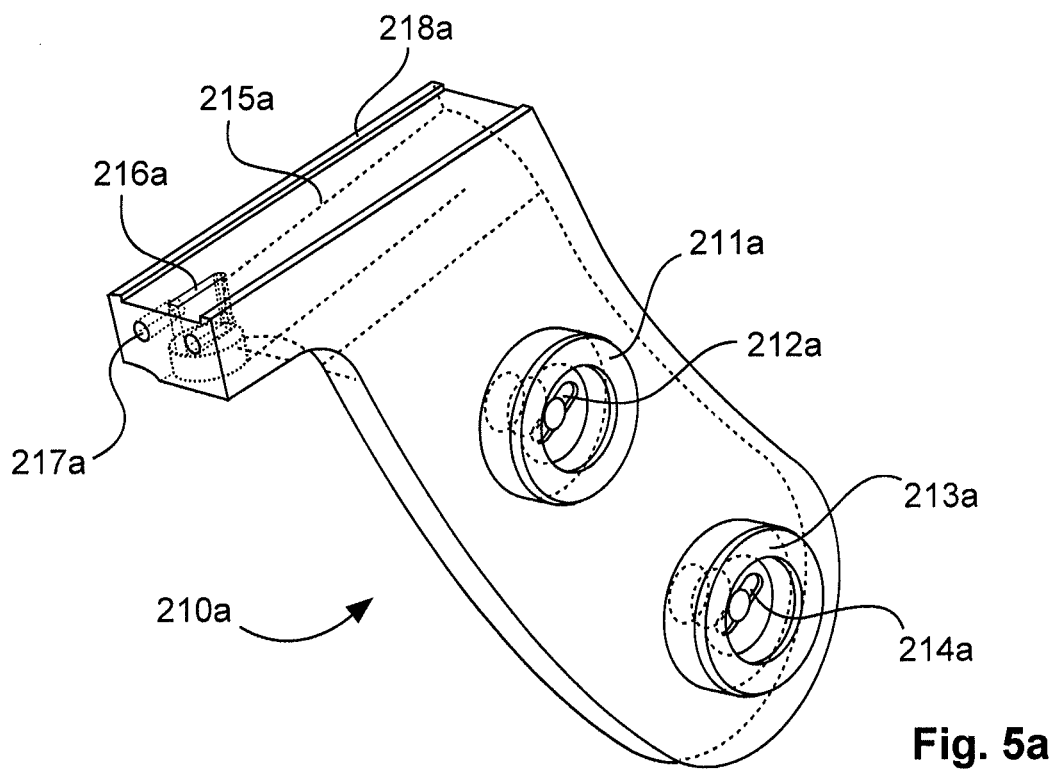
Figure 5B:
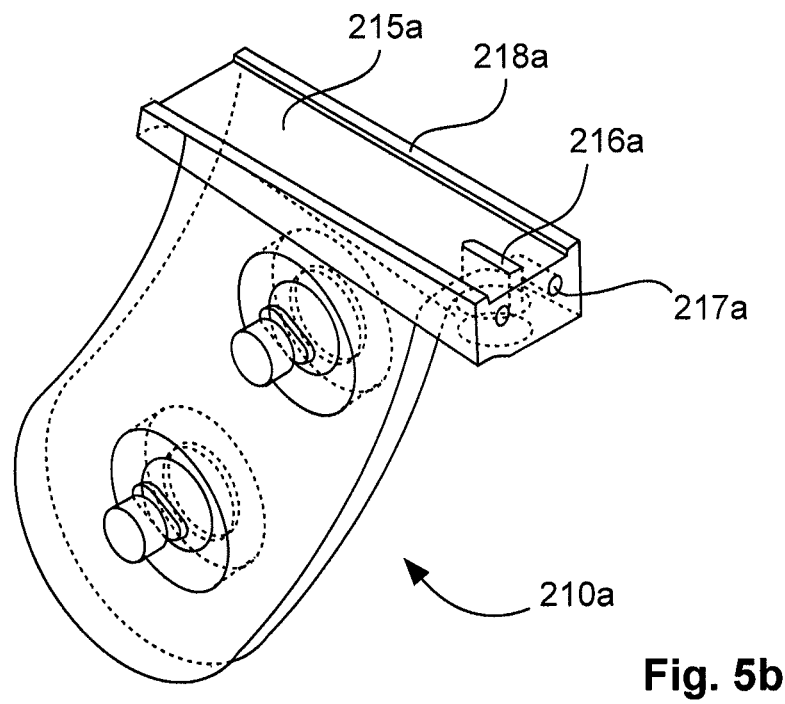
Figure 5C:
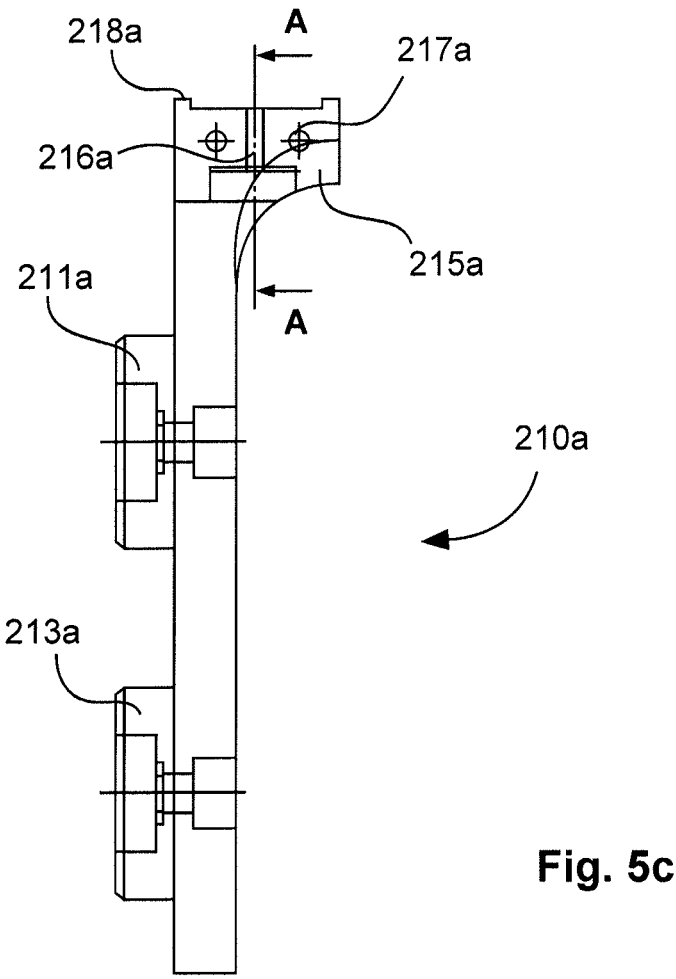
Figure 5D:
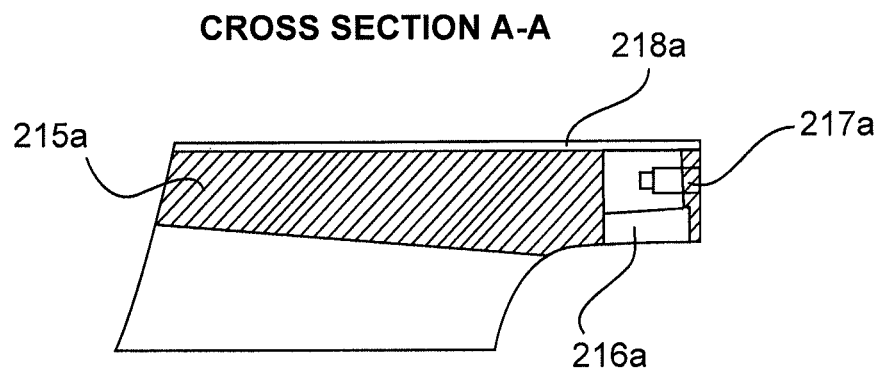
Figure 5E:
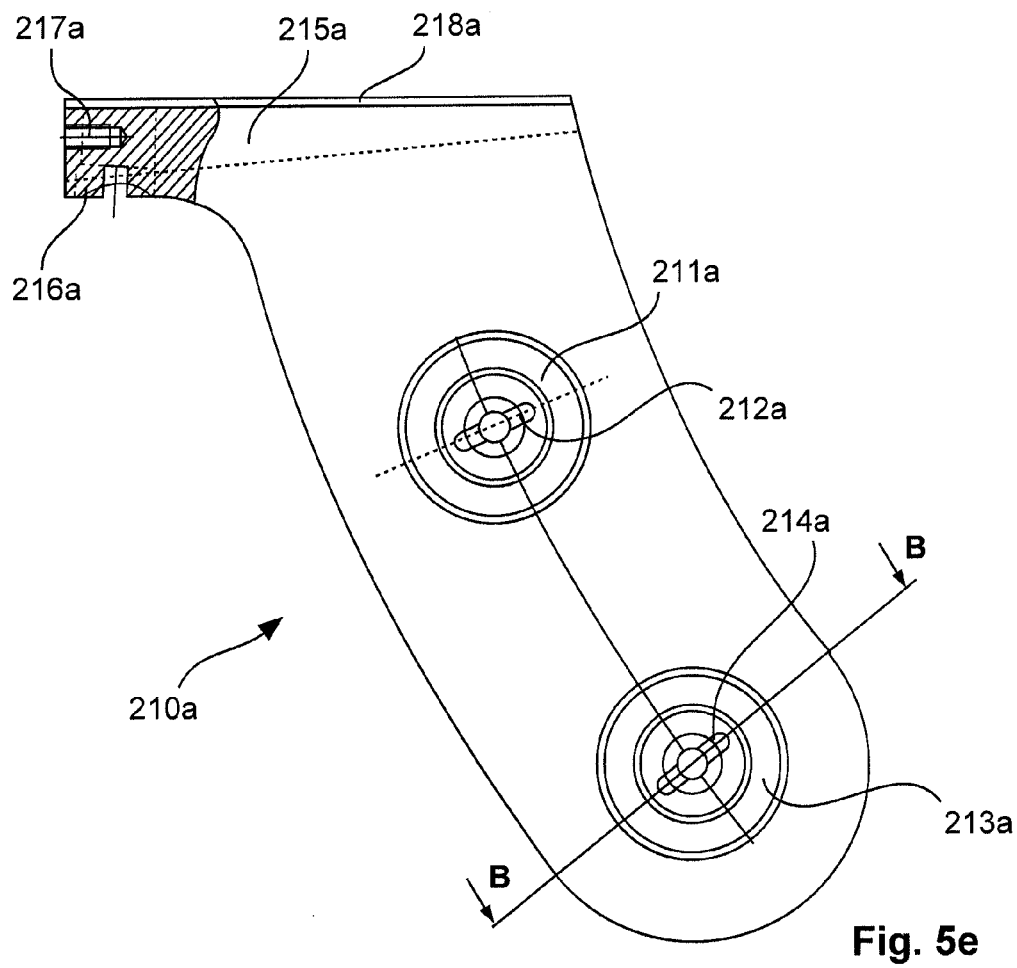
Figure 5F:
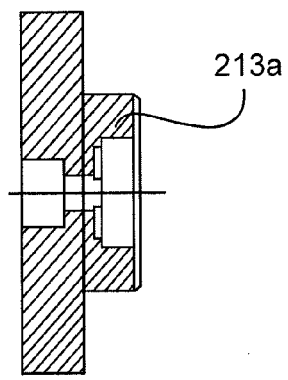
Figure 5G:
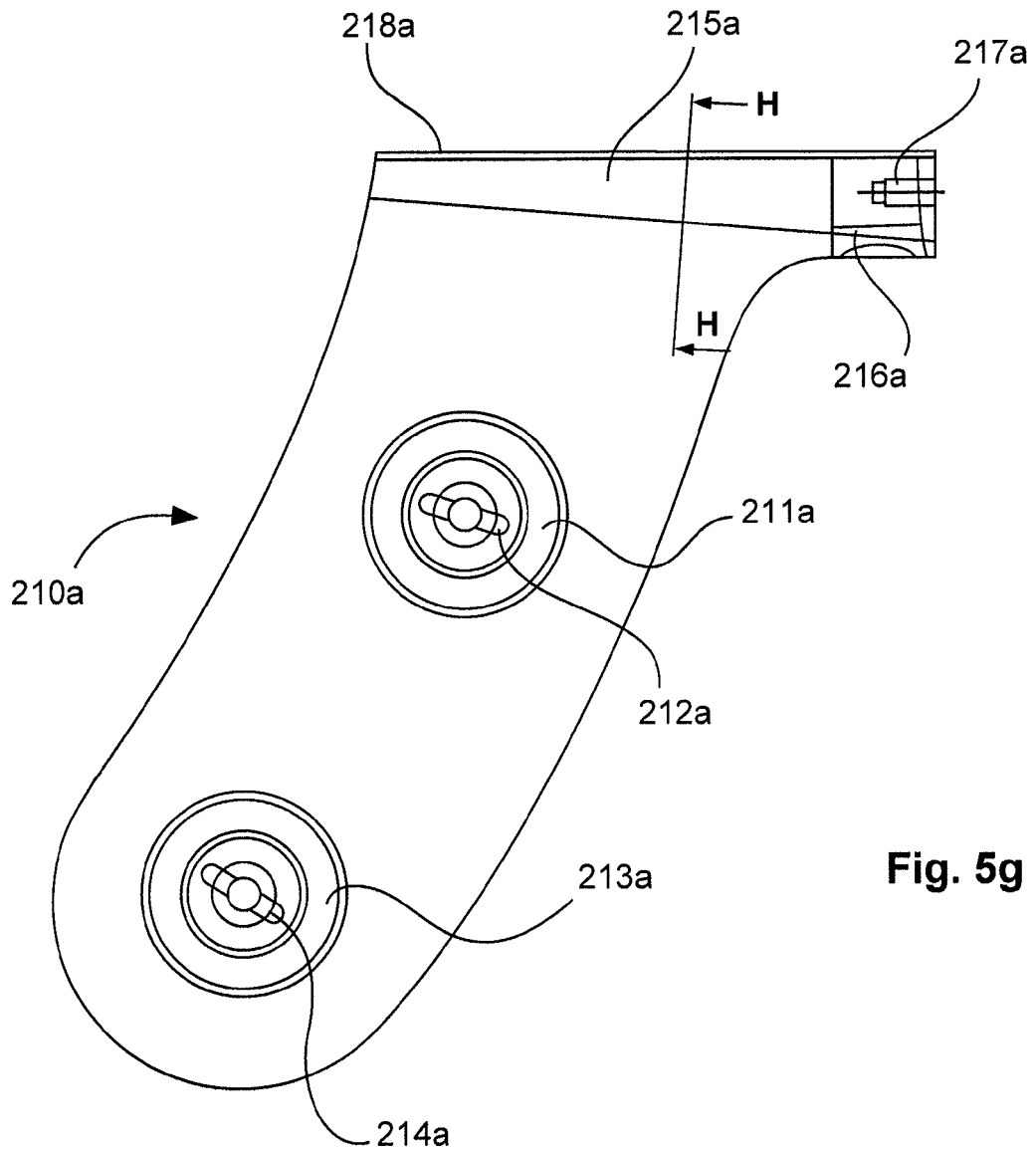
Figure 5H:
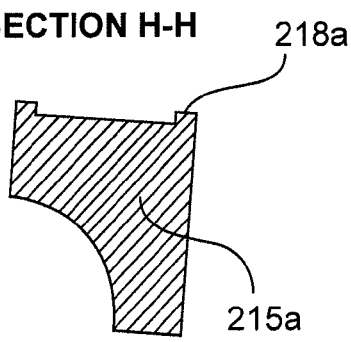
Figure 5I:
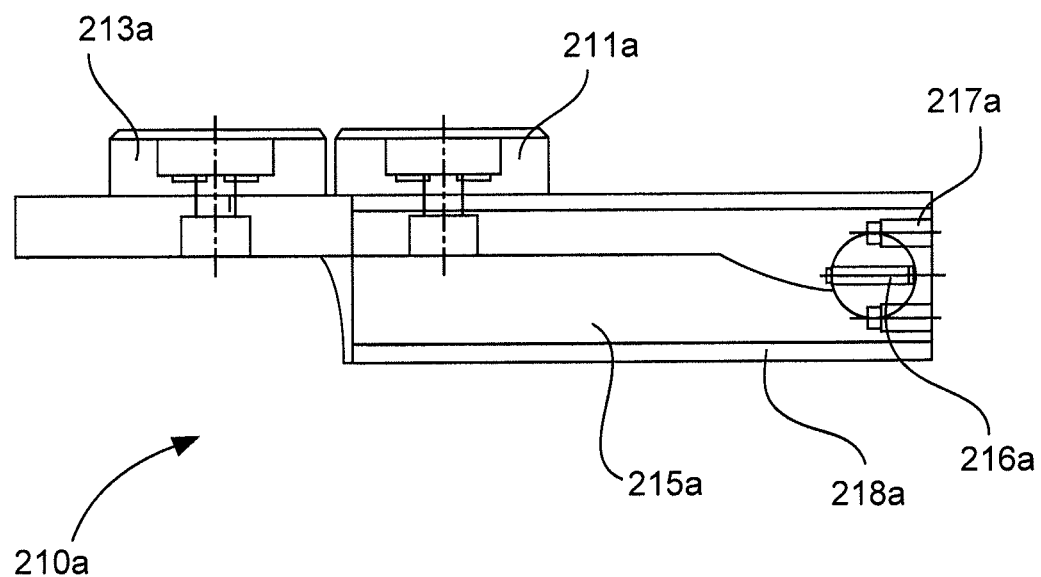
Figure 5J:
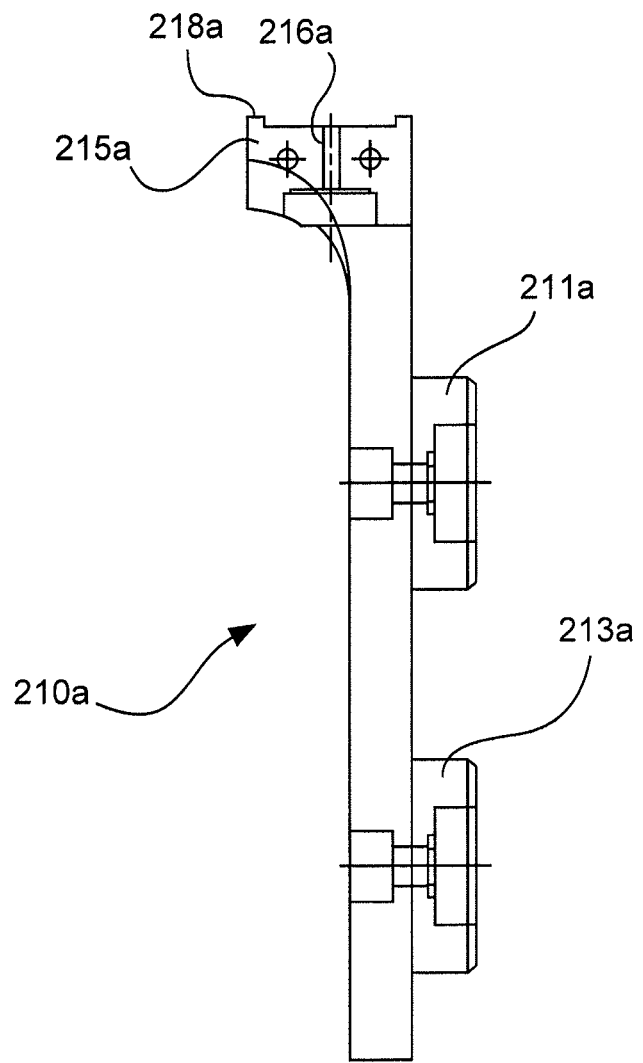
Figure 6A:
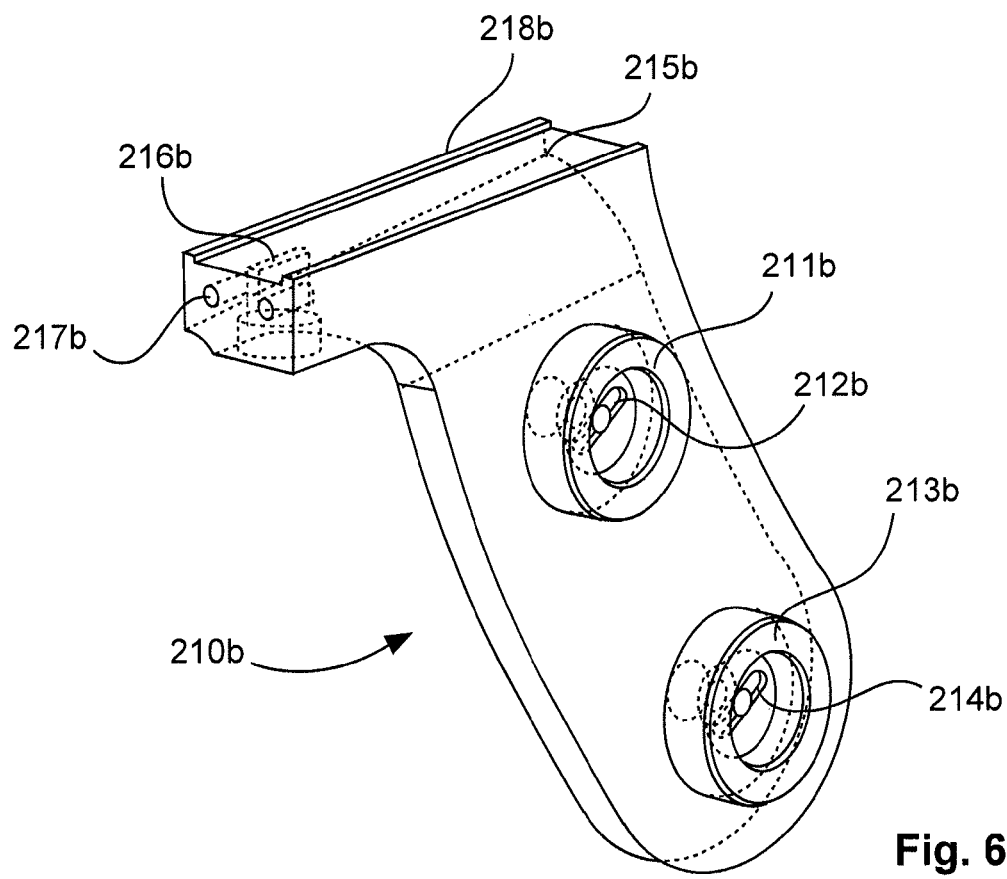
Figure 6B:
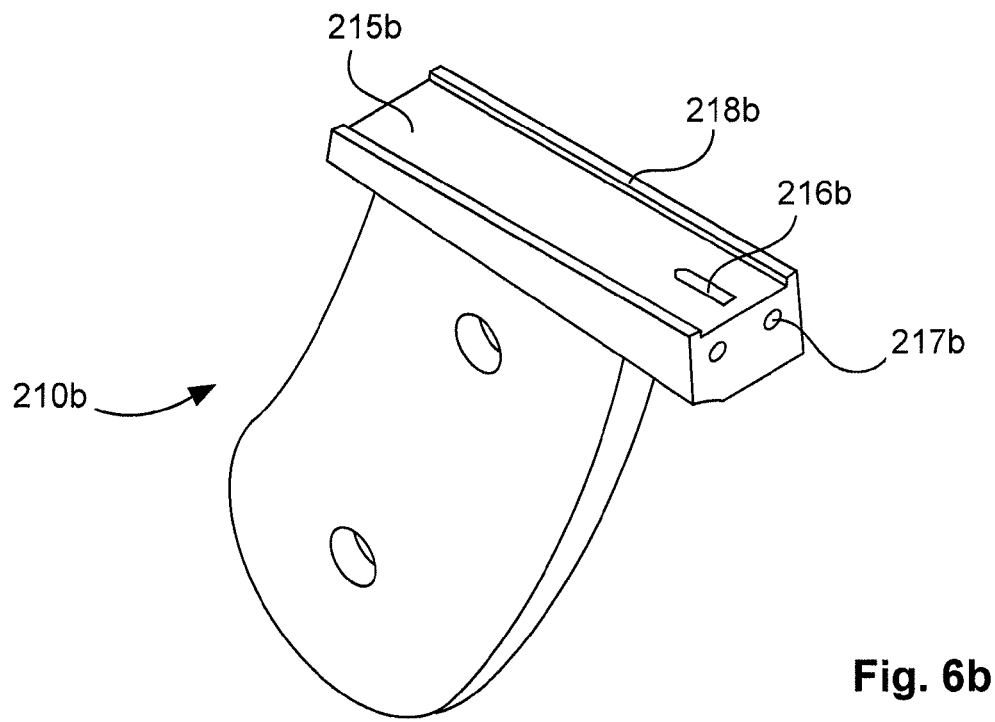
Figure 6C:
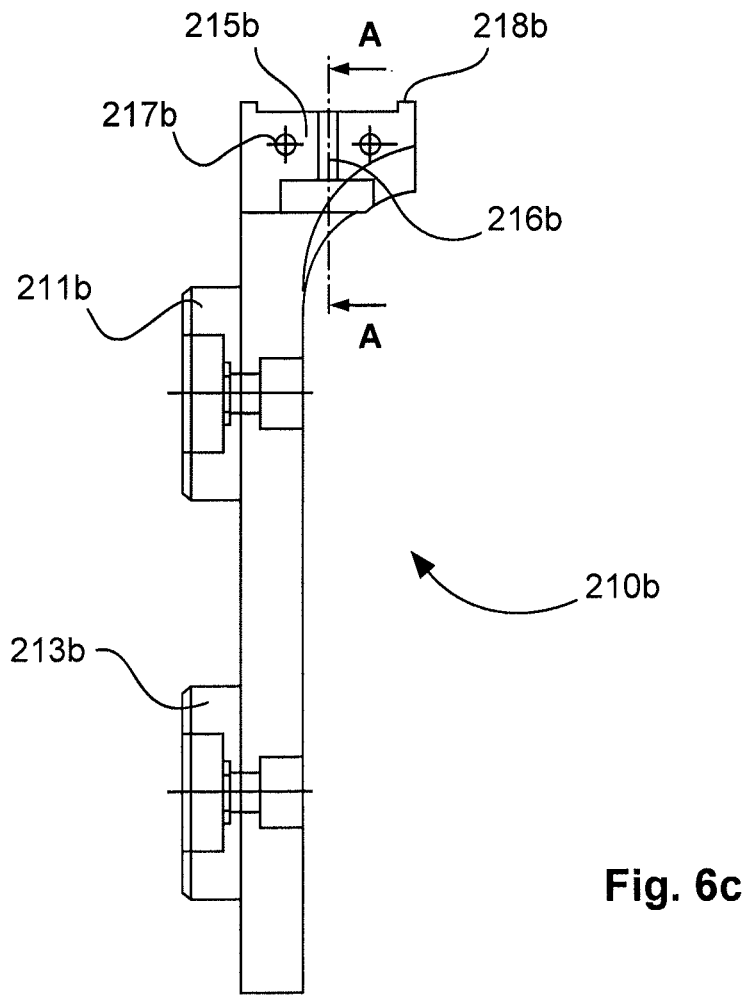
Figure 6D:
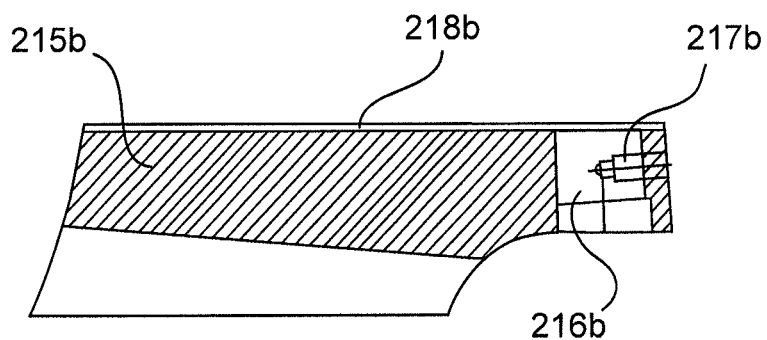
Figure 6E:
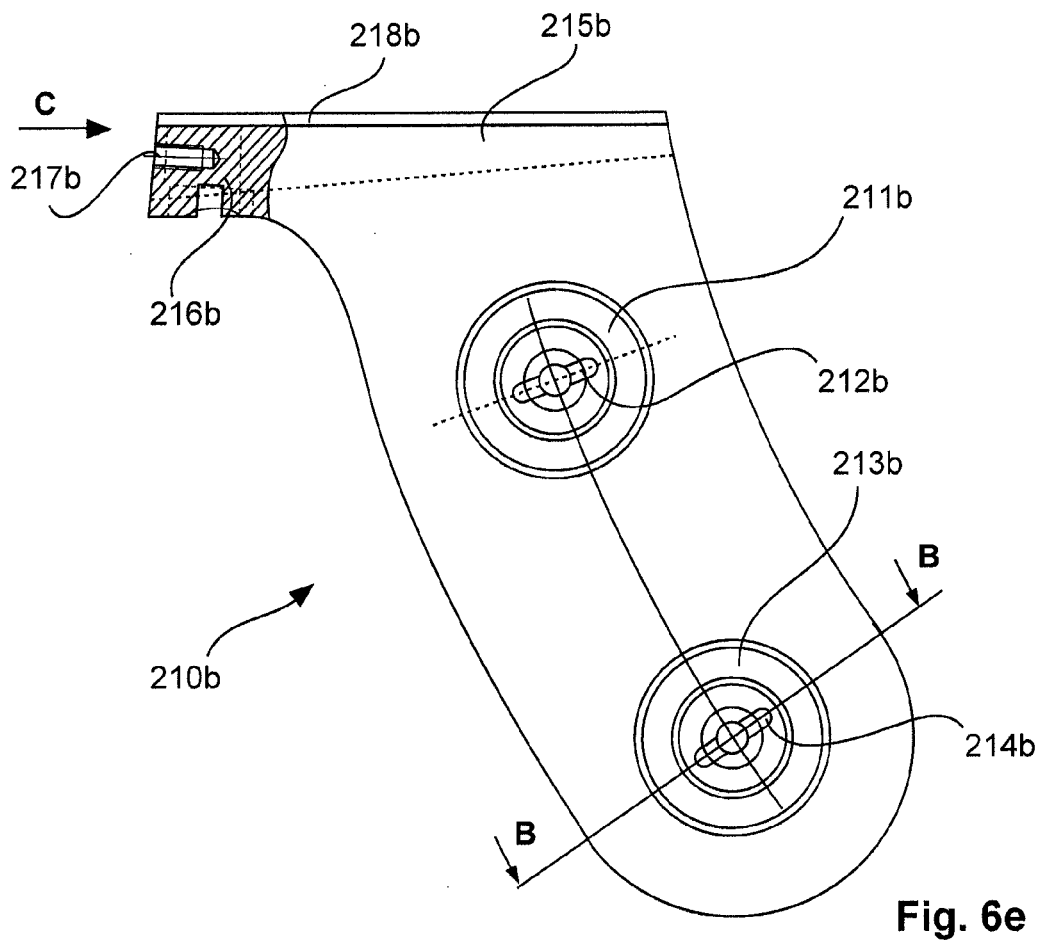
Figure 6F:
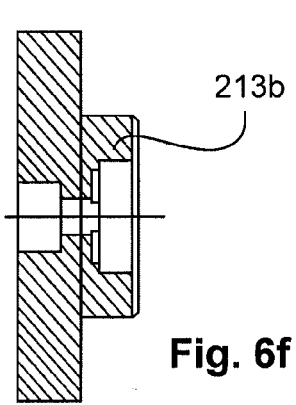
Figure 6F:
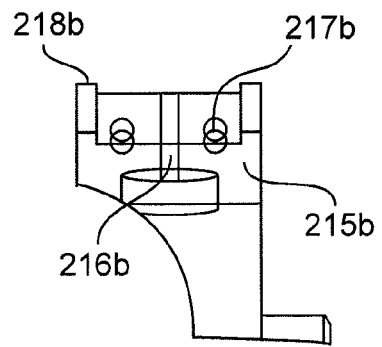
Figure 6G:
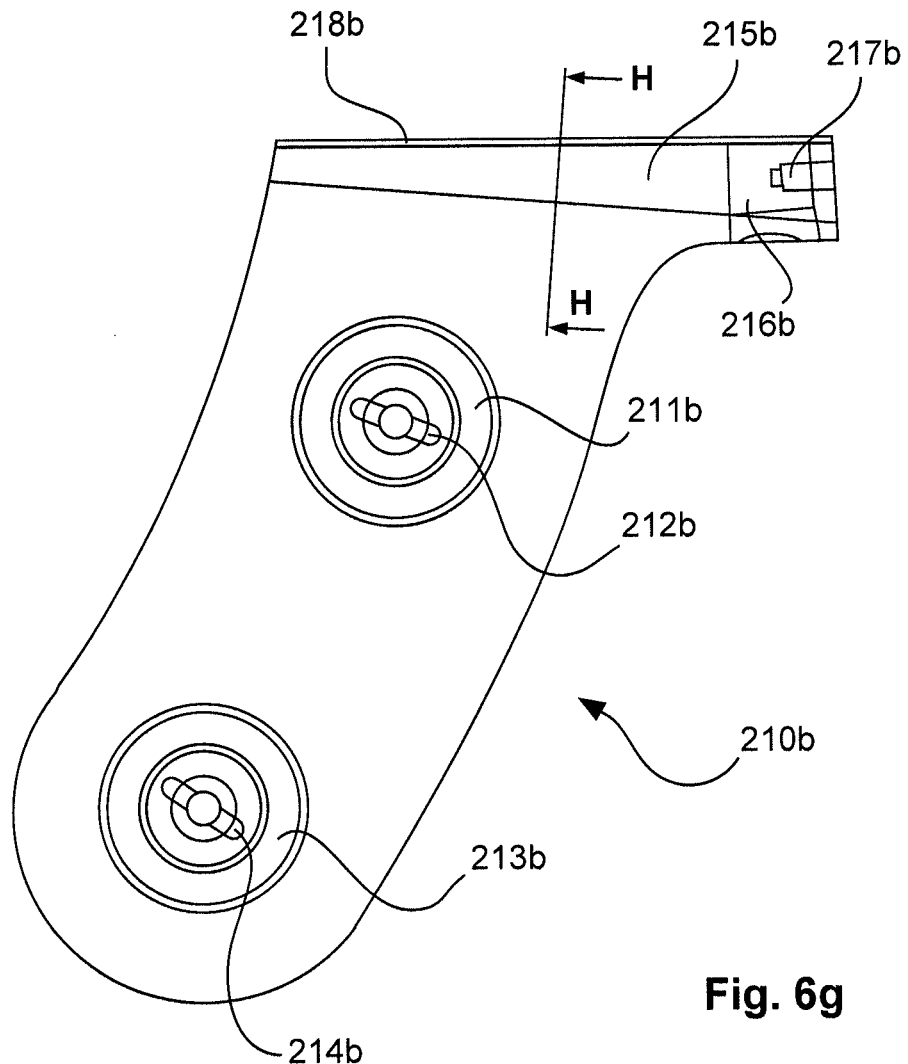
Figure 6H:
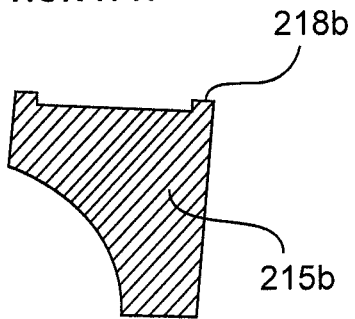
Figure 6I:
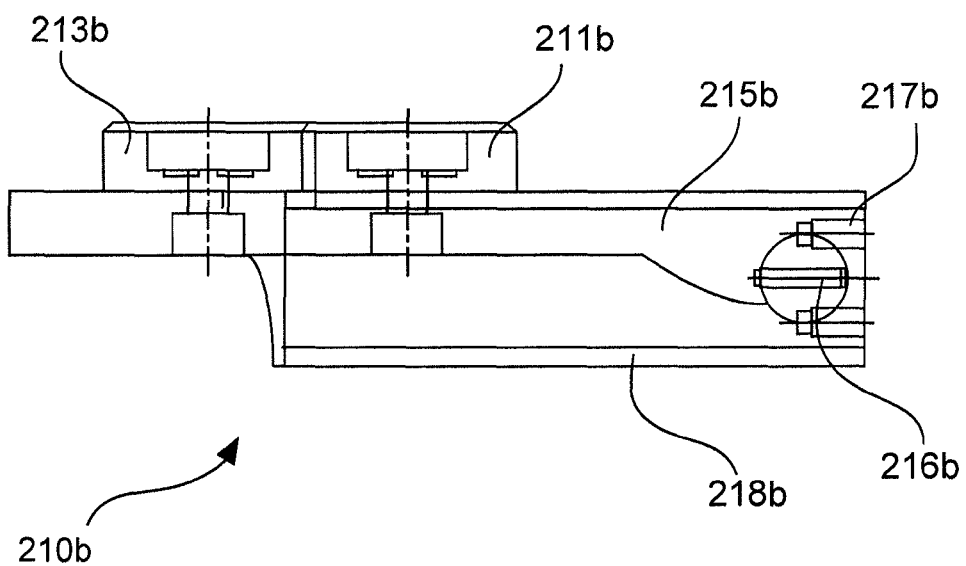
Figure 6J:
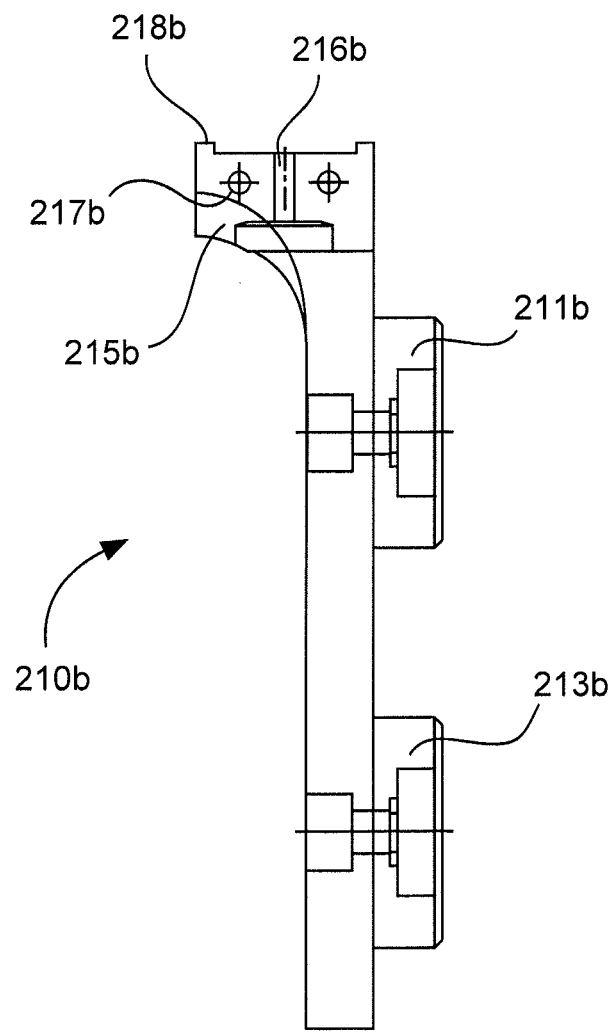
Figures 14A, 14B:
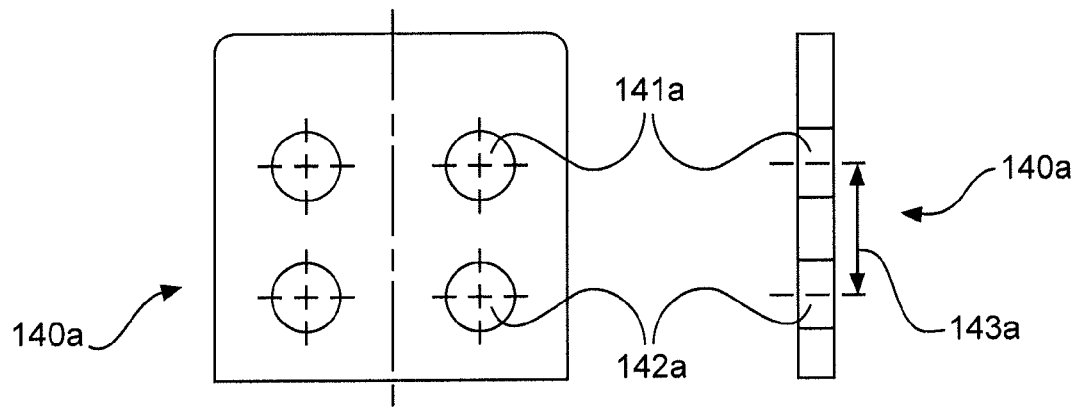
Figure 14C:
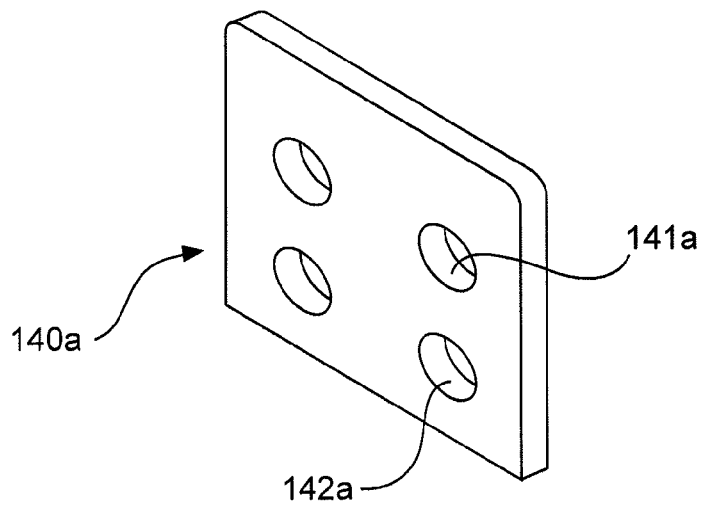
Figures 16A, 16B:
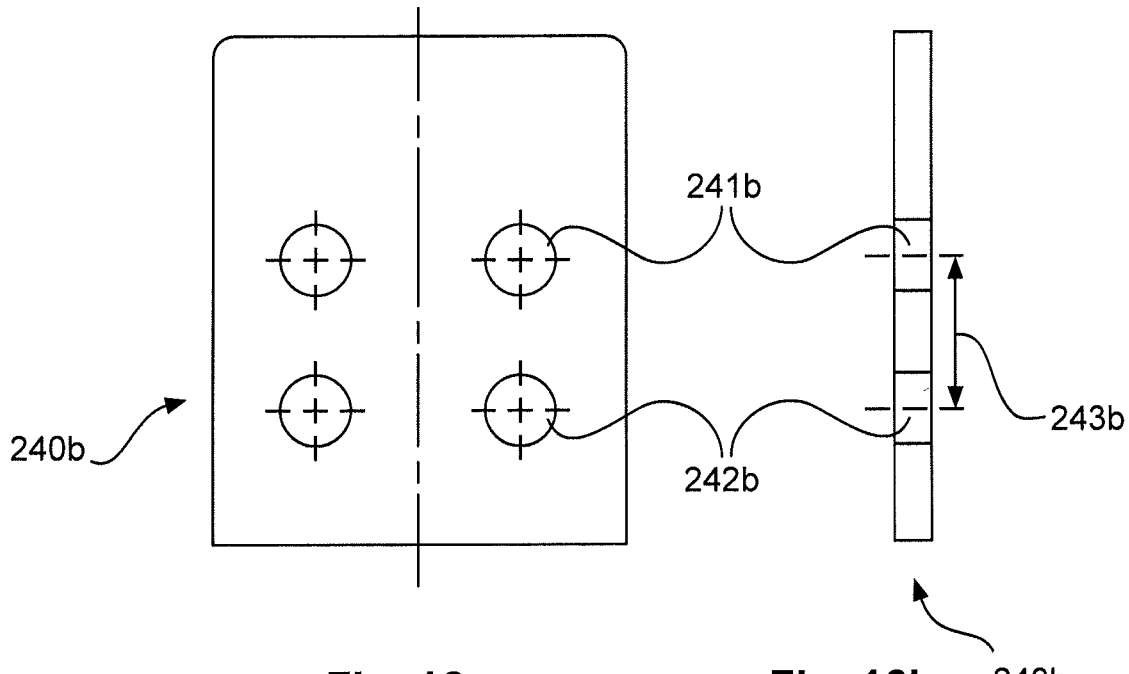
Figure 16C:
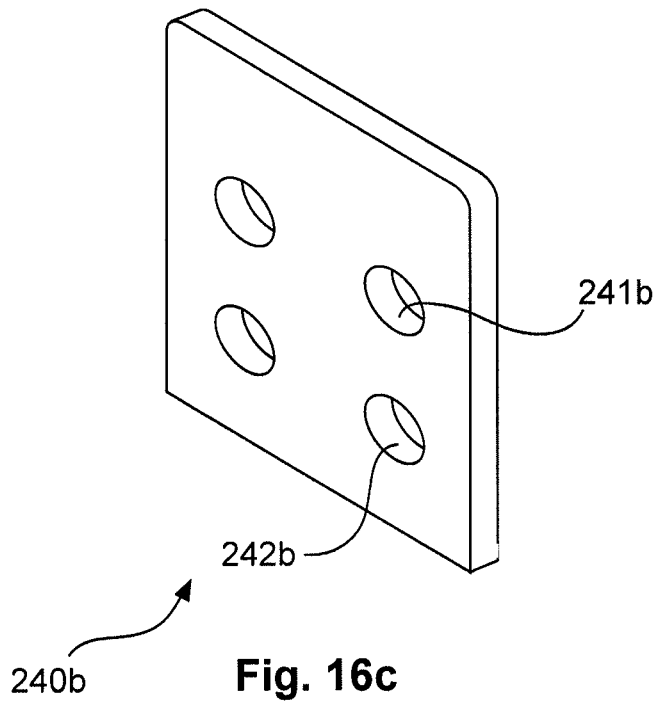
Figures 17A, 17B:
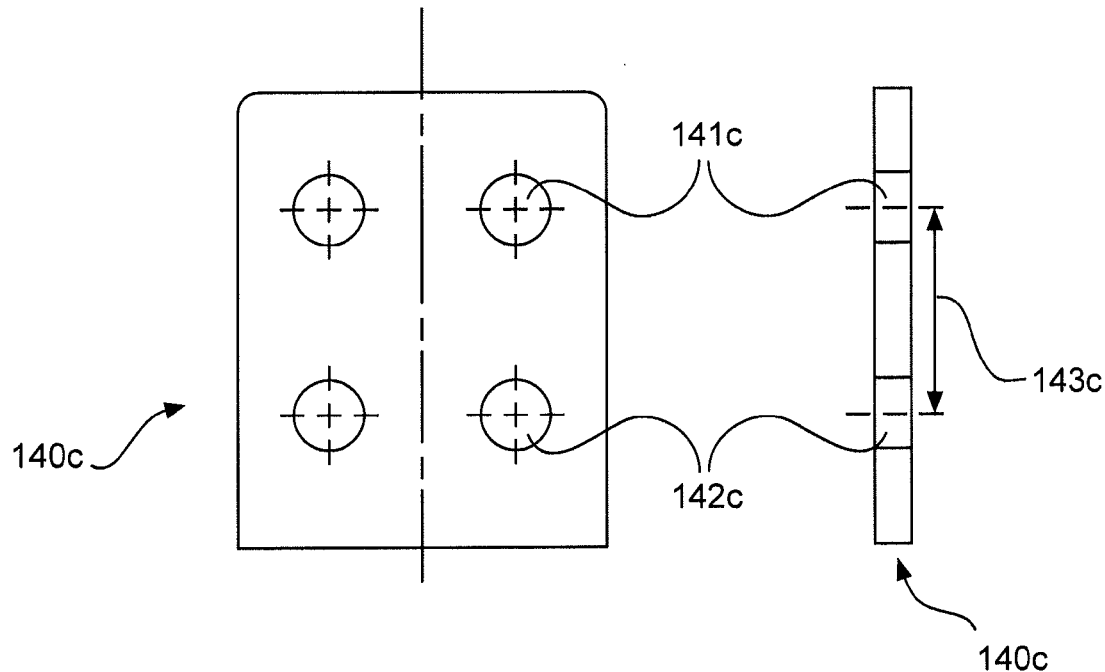
Figure 17C:
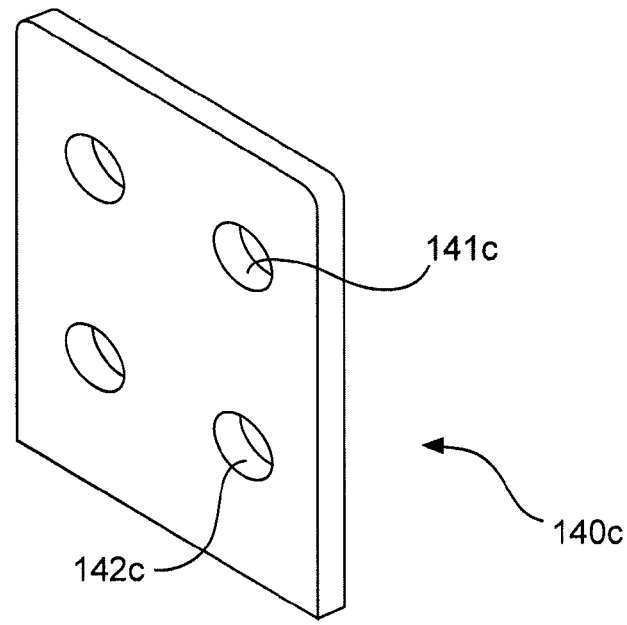
Figures 18A, 18B:
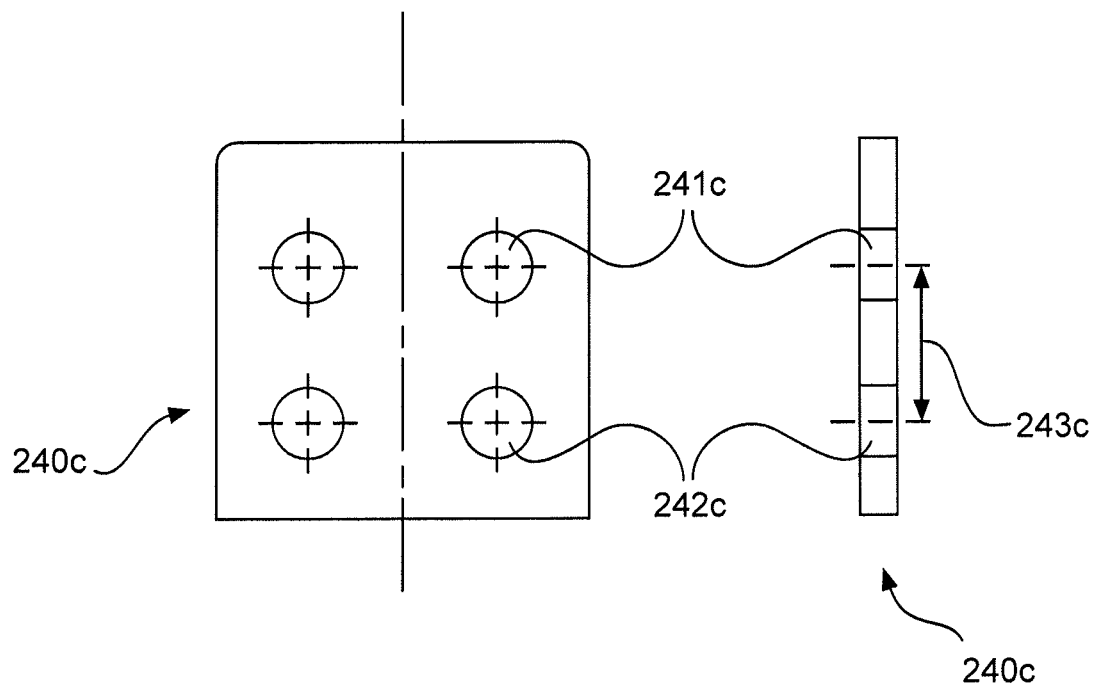
Figure 18C:
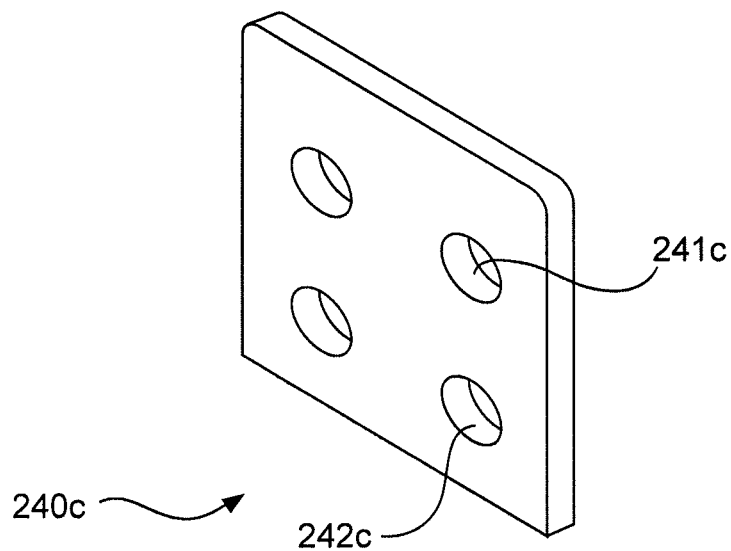
Figure 20A:
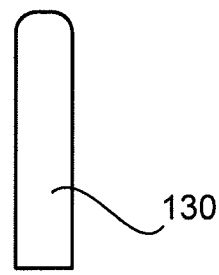
Figure 20B:
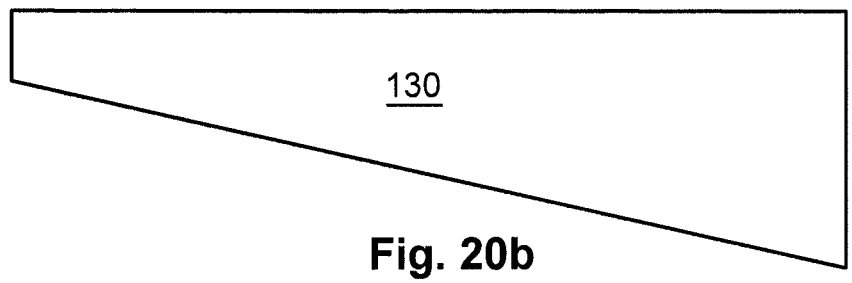
Figure 20C:
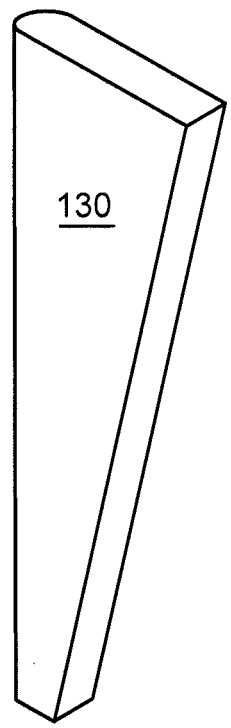

Preferred embodiments of the invention shall now be described by way of example with reference to the attached Figures, in which:

FIG. 1: shows a first embodiment of a rotor locking device according to the invention, in the installed state, FIG. 2*a*: shows a second embodiment of a rotor locking device according to the invention, in the installed state, FIG. 2*b*: shows detail A of FIG. 2*a*, FIG. 2*c*: shows view B in FIG. 2*a*, FIG. 3: shows a third embodiment of a rotor locking device according to the invention, in the installed state, FIGS. 4*a-j*: show the base plate of the first locking member of the embodiment shown in FIG. 1, in different views and cross-sections, FIGS. 5*a-j*: show the base plate of the second locking member of the embodiment shown in FIG. 1, in different views and cross-sections, FIGS. 6*a-j*: show the base plate of the second locking member of the embodiment shown in FIG. 2, in different views and cross-sections, FIGS. 7*a-j*: show the base plate of the first locking member of the embodiment shown in FIG. 3, in different views and cross-sections, FIGS. 8*a-j*: show the base plate of the second locking member of the embodiment shown in FIG. 3, in different views and cross-sections, FIGS. 9*a-d*: show the fixing wedge of the first locking member of the embodiment shown in FIG. 1, in different views and cross-sections, FIGS. 10*a-d*: show the fixing wedge of the second locking member of the embodiment shown in FIG. 1, in different views and cross-sections, FIGS. 11*a-d*: show the fixing wedge of the second locking member of the embodiment shown in FIG. 2, in different views and cross-sections, FIGS. 12*a-d*: show the fixing wedge of the first locking member of the embodiment shown in FIG. 3, in different views and cross-sections, FIGS. 13*a-d*: show the fixing wedge of the second locking member of the embodiment shown in FIG. 3, in different views and cross-sections, FIGS. 14*a-c*: show the connecting plate of the first locking member of the embodiment shown in FIG. 1, in different views and cross-sections, FIGS. 15*a-c*: show the connecting plate of the second locking member of the embodiment shown in FIG. 1, in different views and cross-sections, FIGS. 16*a-c*: show the connecting plate of the second locking member of the embodiment shown in FIG. 2, in different views and cross-sections, FIGS. 17*a-c*: show the connecting plate of the first locking member of the embodiment shown in FIG. 3, in different views and cross-sections, FIGS. 18*a-c*: show the connecting plate of the second locking member of the embodiment shown in FIG. 3, in different views and cross-sections, FIGS. 19*a-c*: show a plan view, a cross-sectional and a three-dimensional front and rear view of a nut which can be used in any of the embodiments shown and FIGS. 20a-c: shows a plan view, a side elevation view and a three-dimensional view of a connecting wedge which can be used in any of the embodiments shown.

In the drawings, elements that have identical or substantially identical functions are marked with the same reference signs. Special features of the three embodiments shown here by way of example are each indicated with a letter a, b or c suffixed to the reference sign. Any generally described properties, features or advantages apply to all three of the exemplary embodiments.

FIGS. 1 to 3 each show a circular perforated disk 300a, b, c which is connected torsionally stiffly via recesses 320a, b, c to a shaft 330a, b, c of a wind turbine. Main shaft 330a, b, c is also connected torsionally stiffly via clamping screws to the hub of the rotor (not shown). Main shaft 330a, b, c, perforated disk 300a, b, c and the rotor thus form a unit that is interconnected torsionally stiffly. Locking any one of these components therefore locks the respective other two components as well.

Perforated disk 300a, b, c also has 24 holes 310a, b, c, which are arranged at intervals of 15° apart along perforated disk 300a, b, c and which are used to lock perforated disk 300a, b, c, shaft 330a, b, c and the rotor.

Main shaft 330a, b, c is rotatably mounted on a stationary base frame (not shown). Locking bolts 411, 421, which are fixedly mounted by the manufacturer and hence likewise stationary, are displaceably disposed on said base frame, in a die-cast frame 410, 420 which is fixedly connected to the base frame and parallel to main shaft 330a, b, c. By removing locking bolts 411, 421 out of die-cast frame 410, 420 and by locking bolts 411, 421 engaging with recesses 310a, b, c of perforated disk 300a, b, c, perforated disk 300a, b, c and hence main shaft 330a, b, c connected torsionally stiffly thereto are locked in relation to the base frame. However, depending on how the rotor is mounted on perforated disk 300a, b, c and on how perforated disk 300a, b, c is mounted on main shaft 330a, b, c via recesses 320a, b, c, what may happen is that it is not possible to lock a rotor blade in exactly the 6 o'clock position, i.e. with the longitudinal axis of the rotor blade in a vertical plane formed by the longitudinal axis of main shaft 330a, b, c and the longitudinal axis of the wind turbine, but instead that the rotor blade is deflected in relation to that plane when locked, said deflection amounting to between 0° and 15° in the examples shown here. In order to lock the rotor exactly, such that one of the blades is locked in exactly the 6 o'clock position, locking bolts 411, 421 provided by the manufacturer cannot therefore be used in such cases.

By means of the three embodiments 10a, b, c of the mobile rotor locking device according to the invention shown here by way of example, such exact positioning of a rotor blade in the 6 o'clock position is permitted, however, in a particularly simple and advantageous manner. The mobile rotor locking device 10a, b, c according to the invention has a respective first locking member 100a, b, c and a second locking member 200a, b, c. The first locking member 100a, b, c is on the left in the view shown in FIGS. 1, 2a and 3, and the second locking member 200a, b, c is on the right. Both locking members 100a, b, c, 200a, b, c are detachably attached via attachment devices 111a, b, c, 113a, b, c, 211a, b, c, 213a, b, c with nuts 150 to perforated disk 310a, b, c and hence to main shaft 330a, b, c. Each of the two locking members 100a, b, c, 200a, b, c also has a contact surface 121a, b, c, 22a, b, c formed on respective fixing wedge 120, by means of which contact surface they engage with counter-surfaces 412, 422 of the two die-cast frames 410, 420 of locking bolts 411, 421.

The locking mechanism of the rotor locking device 10a, b, c according to the invention is thus realized as follows: The first locking member 100a, b, c prevents clockwise rotation of perforated disk 300a, b, c and hence of main shaft 330a, b, c due to its being attached to perforated disk 300a, b, c and hence to main shaft 330a, b, c, on the one hand, and to the stop member of contact surface 121a, b, c on counter-surface 412 of die-cast frame 410 and hence to the base frame, on the other hand. Anti-clockwise rotation is prevented via second locking member 200a, b, c, since this locking member 200a, b, c is likewise attached to perforated disk 300a, b, c and hence to main shaft 330a, b, c, and anti-clockwise rotation is prevented by the stop member of contact surface 221a, b, c on counter-surface 422 of die-cast frame 420, thus preventing the rotor which is attached torsionally stiffly to perforated disk 300a, b, c and hence also to shaft 330a, b, c from rotating in either direction relative to the base frame.

As can clearly be seen by comparing FIGS. 1 to 3 and the other associated Figures, the dimensions of the first and second locking members 100a, b, c, 200a, b, c differ in the three exemplary variants 10a, b, c of the invention and are chosen such that the center of a recess 310'a, b, c of perforated disk 300a, b, c has a clockwise deflection of 3.75° (FIG. 1), 7.5° (FIG. 2) or 11.25° or 11.75° relative to the vertical (FIG. 3). The degrees specified here are preferred for specific fields of use (e.g. wind turbine type and state of assembly). Depending on the field of use, other, different degrees may be preferred. The dimensions are preferably chosen such that the degrees corresponding to a specific position of perforated disk 300a, b, c and hence of the rotor attached torsionally stiffly to it are matched to the respective wind turbine or specific type of wind turbine in such a way that a corresponding deflection of perforated disk 300a, b, c results in the rotor being locked with a rotor blade in exactly the 6 o'clock position.

The structure of the first and second locking members 100a, b, c, 200a, b, c shall now be described in more detail with reference to FIGS. 4 to 20. For the sake of better readability, the use of letters a, b, c after the reference signs will be dispensed with in the following. Unless otherwise explained, the descriptions apply respectively to all three embodiments a, b, c.

Locking members 100, 200 have a base plate 110, 210 which is adapted to the shape of circular perforated disk 300, and a stop portion 115. Two attachment devices 111, 113, 211, 213 are provided on base plate 110, 210 for detachably attaching locking members 100, 200 to perforated plate 300. Nuts 150 interact with attachment devices 111, 113, 211, 213. Each of recesses 111, 113, 211, 213 has a hole in the middle and an additional slot-shaped recess 112, 114, 212, 214. Attachment devices 111, 113, 211, 213 are arranged on base plate 110, 210 in such a way that they can be inserted into two adjacent recesses 310 of perforated plate 300 and that a nut 150 can be inserted into each of attachment devices 111, 113, 211, 213 from the opposite side of perforated disk 300. Nuts 150 are hat-shaped and identical in design for all attachment devices 111, 113, 211, 213 and have a raised portion 152 which can engage in slotted recesses 112, 114, 212, 214 of attachment devices 111, 113, 211, 213. The nuts can be fastened via recess 151 and the holes in the middle of attachment devices 111, 113, 211, 213 to base plate 110, 210, with base plate 110, 210 thus being securely attached to perforated disk 300 disposed between base plate 110, 210 and nuts 150.

To provide the stop surface 121, 221 for engaging locking members 100, 200 with the die-cast frame 410, 420 and hence with the base frame, embodiments 10 of the mobile rotor locking device according to the invention provide the following configuration: Each stop portion 115, 215 of base plate 110, 210 is designed to receive a fixing wedge 120, 220. Stop section 115 has a slot-shaped recess 116 and two blind holes 117, 217. Side walls 118, 218 of said section are also slightly elevated. Fixing wedge 120, 220 is placed between side walls 118, 218, and a connecting wedge 130, which may be identical in design for all variants of the invention, is guided or knocked through slotted recesses 123, 223 of fixing wedge 120, 220 and the slotted recesses 116, 216 of base plate 110, 210. A connecting plate 140, 240 is then bolted to fixing wedge 120, 220 and base plate 110, 210. For this purpose, connecting plate 140, 240 has four recesses 141, 142, 241, 242, into which screws to be received in holes 117, 217, 124, 224 of base plate 110, 210 and of fixing wedge 120, 220 can be screwed. The distance 143, 243 between the two recesses 141, 241 and the two recesses 142, 242 of connecting plate 140, 240 is matched thereby to the dimensions of the various variants of base plate 110, 210 and fixing wedge 120, 220.

The elements shown in FIGS. 1 to 20 together form a kit for assembling a mobile rotor locking device, in which the respective first and second locking members 100, 200 can be selected according to the model and installation state of the rotor on the main shaft, such that, in respective wind turbine in a specific state of assembly a rotor blade can be reliably locked exactly in the 6 o'clock position.

The invention claimed is:

1. A mobile rotor locking device (10 a, b, c) for locking a rotor of a wind turbine, the rotor locking device being designed to lock a rotor in such a way that it is prevented from rotating about a horizontal axis, and that a longitudinal axis of a rotor blade is fixed in a vertical plane,
    characterized in that the rotor locking device is designed to fix a main shaft (330 a, b, c), on which a rotor is disposed torsionally stiffly, so that it is prevented from rotating about its longitudinal axis, and
    characterized in that the rotor locking device comprises a first and a second locking member (100 a, b, c, 200 a, b, c), each of the two locking members comprising an attachment device for attaching the locking member to the main shaft, and a contact surface (121 a, b, c, 221 a, b, c) for transferring compressive forces to a stationary base frame.

2. The mobile rotor locking device (10 a, b, c) of claim 1, characterized in that the first locking member (100 a, b, c) is designed to fix the main shaft (330 a, b, c) so that it is prevented from rotating about its longitudinal axis in a first direction, and the second locking member (200 a, b, c) is designed to fix the main shaft to prevent it from rotating about its longitudinal axis in a second direction opposite to the first.

3. The mobile rotor locking device (10 a, b, c) of claim 1, characterized in that each of the two locking members (100 a, b, c, 200 a, b, c) comprises a base plate (110 a, b, c, 210 a, b, c) and a fixing wedge (120 a, b, c, 220 a, b, c), the fixing wedge having a recess for receiving a connecting wedge (130).

4. The mobile rotor locking device (10 a, b, c) of claim 3, characterized in that the base plate (110 a, b, c, 210 a, b, c) comprises a stop portion (115 a, b, c, 215 a, b, c), the stop portion having a recess for receiving the connecting wedge (130).

5. The mobile rotor locking device (10 a, b, c) of claim 3, characterized in that each locking member (100 a, b, c, 200 a, b, c) has a connecting plate (140a, b, c, 240a, b, c) designed to connect the base plate (110 a, b, c, 210 a, b, c) and the fixing wedge (120 a, b, c, 220 a, b, c) of the first and the second locking members respectively to each other.

6. The mobile rotor locking device (10 a, b, c) of claim 1, characterized in that the second locking member (200 a, b, c) has dimensions different from those of the first locking member (100 a, b, c).

7. A kit for the mobile rotor locking device (10 a, b, c) of claim 1,
    characterized in that the kit comprises the two different locking members (100 a, b, c, 200 a, b, c) comprising two different base supporting plates (110 a, b, c, 210 a, b, c) and/or two different fixing wedges (120 a, b, c, 220 a, b, c) and/or two different connecting plates (140 a, b, c, 240 a, b, c).

8. A locking member for a mobile rotor locking device (10 a, b, c) for locking a rotor of a wind turbine,
    characterized in that the locking member (100 a, b, c, 200 a, b, c) is designed to fix a main shaft (330 a, b, c) so that it is prevented from rotating about its longitudinal axis in one direction, and
    characterized in that the locking member comprises an attachment device for attaching the locking member to the main shaft, and a contact surface (121 a, b, c, 221 a, b, c) for transferring compressive forces to a stationary base frame.

9. A method for locking a rotor of a wind turbine, said method comprising the steps of:
    providing a mobile rotor locking device (10 a, b, c) comprising a locking member (100 a, b, c, 200 a, b, c),
    locking a rotor in such a way that it is prevented from rotating about a horizontal axis, and that a longitudinal axis of a rotor blade is fixed in a vertical plane,
    characterized in that the locking step includes fixing a main shaft (330 a, b, c), on which a rotor is disposed torsionally stiffly, to prevent it from rotating about its longitudinal axis, and
    characterized in that fixing the main shaft comprises attaching an attachment device of the locking member to the main shaft, and transferring compressive forces to a stationary base frame by a contact surface of the locking member.

* * * * *